(12) United States Patent
Ehring et al.

(10) Patent No.: US 7,558,748 B2
(45) Date of Patent: Jul. 7, 2009

(54) PURPOSE-BASED ADAPTIVE RENDERING

(75) Inventors: Dan Ehring, Half Moon Bay, CA (US); Robert Carpenter, El Granada, CA (US); Matthew E. Wyman, Half Moon Bay, CA (US); Daniel B. Leifker, San Francisco, CA (US); Michael Piech, San Francisco, CA (US)

(73) Assignee: Dorado Network Systems Corporation, San Mateo, CA (US)

( * ) Notice: Subject to any disclaimer, the term of this patent is extended or adjusted under 35 U.S.C. 154(b) by 275 days.

(21) Appl. No.: 11/011,472

(22) Filed: Dec. 13, 2004

(65) Prior Publication Data

US 2005/0097008 A1    May 5, 2005

Related U.S. Application Data

(63) Continuation of application No. 09/466,541, filed on Dec. 17, 1999, now abandoned.

(51) Int. Cl.
*G06F 17/30* (2006.01)
(52) U.S. Cl. .......................................... 705/27; 705/26
(58) Field of Classification Search .................. 705/26, 705/27
See application file for complete search history.

(56) References Cited

U.S. PATENT DOCUMENTS

| 6,397,212 | B1 * | 5/2002 | Biffar | 707/5 |
| 6,519,571 | B1 * | 2/2003 | Guheen et al. | 705/14 |
| 2005/0097008 | A1 | 5/2005 | Ehring et al. | |

OTHER PUBLICATIONS

Aceto, Christine; "Managing web content," Document World, Sep./Oct. 1999, v4n5pp18-23; Dialog file 15 #01911563, 7pgs.*

* cited by examiner

*Primary Examiner*—Robert M. Pond
(74) *Attorney, Agent, or Firm*—Orrick, Herrington & Sutcliffe LLP

(57) ABSTRACT

The present invention provides an automated interactive system that enables an author to build applications that handle complex consumer-merchant interactions. The author designs content components and application rules that are interpreted by the system dynamically, at runtime, to generate and deliver to users personalized HTML web pages, including client-side objects that track user behavior and enhance users' interaction with the application. Such rules dynamically adapt the author's goals to the appropriate users at the appropriate time, thereby simulating the dialogue between users and human salespersons/customer service personnel in the context of an automated interactive system.

12 Claims, 17 Drawing Sheets

PURPOSE-BASED ADAPTIVE RENDERING

RELATED APPLICATION

This application is a continuation of application Ser. No. 09/466,541, filed on Dec. 17, 1999, now abandoned.

FIELD OF THE INVENTION

This invention relates generally to the field of interactive online services, and in particular to complex online service applications in which content is rendered dynamically.

BACKGROUND OF THE INVENTION

Since the advent of the "lowest common denominator" standard of HTML web pages, the popularity of the Internet, particularly the World Wide Web, has exploded; and web content has continued to proliferate exponentially on a worldwide basis. Over the past five years, web content has evolved from mere hyperlinked text-based web pages to a more interactive and visually appealing experience integrating server-based database and search engine technologies with client-side browser and plug-in support for graphics, animation, video, and interactive two-dimensional/three-dimensional objects.

In addition to being a great resource for the distribution of information by individuals and a wide variety of companies, the Web also has become a commercial mecca, replete with online stores, auction sites and various related sites offering product information, targeted advertising, comparison shopping and a host of other commercial services.

The Web has provided the necessary distributed infrastructure to enable the formation of a wide variety of online "communities." Not only can individuals and companies establish web sites to distribute information about themselves and offer their products and services to the puc, but web sites also can create online communities (e.g., for news, chat, gaming, shopping, etc.) with a focus beyond the individual or company establishing the site.

A common characteristic of a great many of these sites is the automation (at least in part) of what otherwise would have been a manual process. For example, online auction sites enable sellers to post their products, and potential buyers to bid on such products, without the intervention of a human auctioneer. Similarly, online shopping sites enable merchants to post their products and/or services, and consumers to browse for, purchase, and arrange for shipment of such products and/or services, without any human intervention by salespersons or other typical store personnel.

Certain consumer-merchant interactions, however, are not so easily automated. For example, complex transactions (e.g., purchasing a home mortgage) and customer support applications (e.g., handling pre-sale inquiries and post-sale troubleshooting problems) present unique challenges that cannot be met by typical online store and database technology. The lack of "human hand-holding" makes one-click shopping features and troubleshooting databases seem particularly unsatisfying in this context in which consumers require greater pre-sale and post-sale support, and "one size doesn't fit all."

In an effort to provide greater personalization, various web sites have for years provided free-form personalized content to registered users. For example, portal sites such as www.excite.com allow users to customize web pages with desired news and sports categories, stock quotes, local weather, restaurant and movie listings, and various other personal selections. Such sites provide users with a personalized, yet automated, experience. Yet, although many of these sites offer online shopping services and access to various specialized databases, they do not apply a personalized approach to the more difficult problem of guiding users through complex consumer-merchant interactions.

It is for this reason that many companies are looking for new approaches to "customer care" or "online customer relationship management." These companies have recognized that it is not sufficient merely to offer personalized portions of web pages to registered users, and to generate HTML web pages dynamically such that different users see different web pages (perhaps with some content in common).

Such companies have gone further by focusing on customer care specifically, and providing application/web site authors with the ability to create rules that determine which content to render to particular users. For example, a recent product, the Dynamo personalization system from Art Technology Group of Cambridge, Mass. (www.atg.com), includes rule-based personalization software that customizes content based on user profile information and observed behavior. It enables authors to "tag" or categorize content and render such content to users that have been similarly categorized.

Products from Brightware, Inc. of Novato, Calif. (www.brightware.com), Broadvision, Inc. of Redwood City, Calif. (www.broadvision.com), and Vignette Corp. of Austin, Tex. (www.vignette.com) offer similar capabilities. Moreover, various patents have been granted on dynamic mechanisms for tracking user activity and customizing the presentation of content to users based upon such prior activities. See, e.g., U.S. Pat. Nos. 5,848,396, 5,717,923, and 5,710,887.

Yet, human customer service personnel would take into account not only profile information and the prior behavior of past, current and prospective customers, but also their own experience in dealing with similarly situated customers and their own goals of providing targeted information and "pushing" certain products and services to such customers, all while recognizing the customer's current place in the overall (e.g., pre-sale through post-sale) process.

What is needed is a highly intelligent system that enables application/web site authors to formulate rules that not only determine dynamically which content is rendered to which users, but which further the author's goals by adapting the selection of content to each user's unique scenario, thereby simulating the dialogue between customers and human salesmen and customer service personnel, but in the context of an automated interactive system.

SUMMARY OF THE INVENTION

The present invention provides an automated interactive system that enables an author to build applications that handle complex consumer-merchant interactions. The author designs content components and application rules that are interpreted by the system dynamically, at runtime, to generate and deliver to users personalized HTML web pages, including client-side objects that track user behavior and enhance users' interaction with the application.

The application rules can be interpreted generally by the system (e.g., each time a new page is rendered), or can be embedded in particular content objects and interpreted only in the context of those objects (e.g., a rule that determines which additional "help" content, if any, is displayed while the user is entering data into a particular text field). Such rules dynamically adapt the author's goals to the appropriate users at the appropriate time, thereby simulating the dialogue between users and human salespersons/customer service personnel in the context of an automated interactive system.

The system resolves rules dynamically by resolving at runtime various different types of conditions included in the rules, including: (i) why a user will receive particular content objects—i.e., which objects most effectively satisfy the author's purpose as specified in the rule; (ii) who will receive such objects—i.e., which users satisfy the user profile, platform and/or behavioral conditions specified in the rule; and (iii) when will such users receive such objects—i.e., under what circumstances (application state) will such objects be delivered to such users.

Moreover, because the rules are resolved dynamically, the parameters included within such rules need not be referenced explicitly. For example, the content objects selected by a rule (e.g., a why condition such as "the most popular tennis shoe ad") might not be known at the time the rule is written. The same is true of the users that will receive such content, and the circumstances under which they will receive that content.

Only at runtime can the system resolve certain conditions—e.g., assessing popularity of an object on a monthly basis by tracking the number of clicks on the object by all users of the application. The system might interpret this same rule at different times to render different content, even to the same user. Moreover, this content might exist at virtually any level of abstraction, from a "primitive object" (e.g., a text field) to a higher-level "content element" (e.g., an address) or "stack" of content elements (e.g., an application form) to an entire "page" (e.g., a product purchase/order page) or user "scenario" having multiple interconnected pages.

In one embodiment of the present invention, the system architecture includes: (i) an application builder, which enables authors to create content objects (at various levels of abstraction) and application rules for adaptively rendering such content objects to users of the application (supplementing the system's built-in "primitive" content objects and application rules, and including author-defined variables as well as "raw" application state information); (ii) databases for user profile and behavior information for individual users and cumulative aggregate information for multiple users of the application across multiple sessions; (iii) a server-side dynamic content composition engine having component managers for dynamically generating content for delivery to the user by interpreting application rules affecting the selection of (a) a new page (and external links) within a new or the current scenario (scenario manager), (b) intra-page content and organization including page templates, stacks and content elements (page manager), (c) the representation of content elements including their component primitive objects, as well as the conversion of all selected content objects into HTML web pages (delivery manager), and (d) client-side objects (converted into client-side code referenced from within HTML web pages), as well as the updating of user databases based upon changes in application state (behavior manager); and (iv) a client-side observation manager for observing user behavior and interaction with an application, and communicating changes in application state back to the server-side dynamic content composition engine, and enhancing the content displayed to the user (observation manager).

IN THE DRAWINGS

The above objects and description of the present invention may be better understood with the aid of the following text and accompanying drawings.

DETAILED DESCRIPTION OF THE PREFERRED EMBODIMENTS

Figure 1:
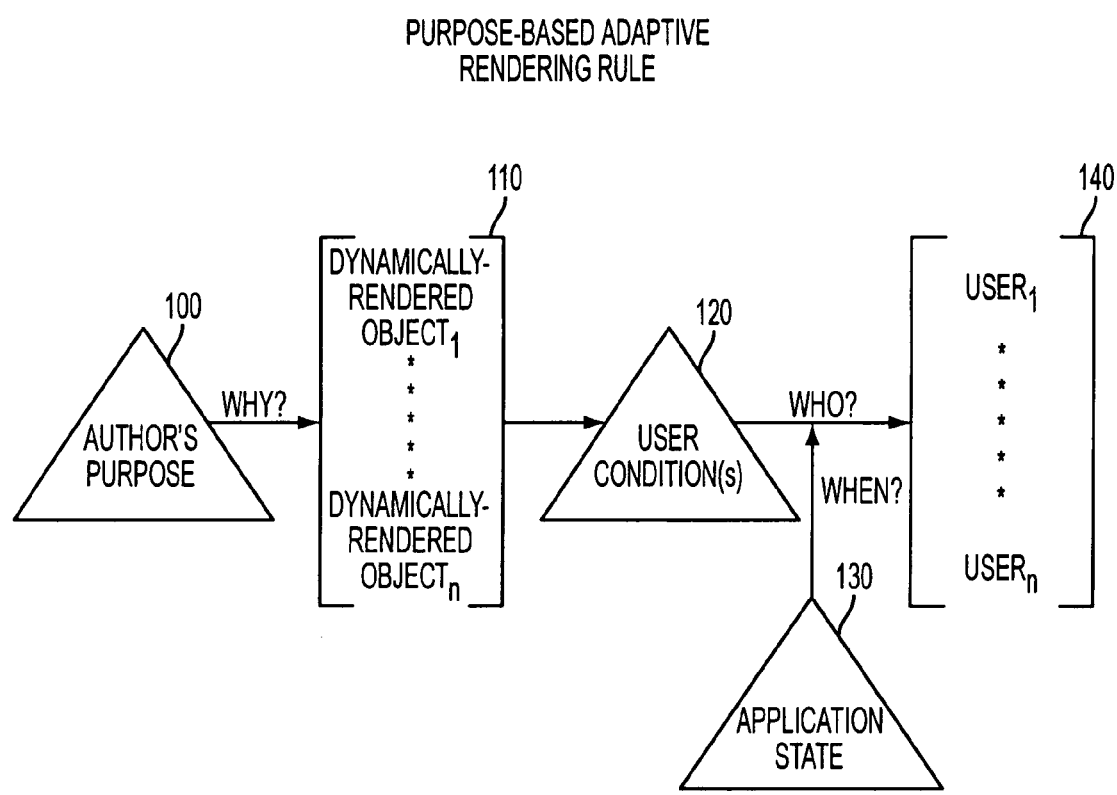
FIG. 1 shows the framework of a purpose-based adaptive rendering rule, as implemented in an embodiment of the present invention.

The adaptive rendering technology of the present invention can be embodied in various forms to permit application authors to engage in a dynamic, automated dialogue with users. In one example embodiment described herein—an online, Internet-based (World Wide Web) consumer transaction service—complex transactions provide the vehicle for such dialogue.

Purpose-Based Adaptive Rendering

The system of the present invention performs purpose-based, adaptive rendering by dynamically rendering various objects and components thereof to particular users of an "application" (e.g., a financial web site) in accordance with certain rules designed by the application author. In one embodiment, an "application" is a combination of web site content, navigation links through such content and application rules.

Authors can design content at various levels of abstraction to facilitate certain goals. For example, an author of an online financial web site might want to encourage users to purchase certain mortgage products. Yet, as is the case with many complex transactions, at any given time, different users may be at different stages of the process. Some may simply be exploring the concept of mortgages, while others may be ready to compare products, and still others ready to configure and purchase a specific product.

The system provides the author with a mechanism for classifying content corresponding to multiple different user "scenarios"—e.g., a series of linked web pages with a specific goal, such as "exploring mortgages," "comparing variable and fixed-rate products," or "applying for a mortgage."

Within each scenario, the author wants to encourage users to complete that scenario and meet the author's associated goals, and possibly move on to a subsequent scenario.

Just as a live salesperson might recognize the "scenario" of a prospective customer, and then selectively engage in a dialogue with that customer in order to provide certain information tailored to meet the customer's needs (and effect the salesperson's purpose—i.e., make a sale), so, too, the system of the present invention dynamically assesses a user's scenario and guides the user to achieve the author's goals by dynamically rendering certain content tailored to that user.

For example, during a user's visits to an online mortgage web site, the user might traverse several scenarios in order to successfully apply for and obtain a mortgage for the purchase of a home. These scenarios could include the following: (1) "Explore"—the user explores the site and learns about mortgages and the available mortgage products; (2) "Decide"—the user, after reviewing the available mortgage products, decides to apply for a fixed-rate mortgage; and (3) "Commit"—the user commits to applying for a particular fixed-rate mortgage and submits a mortgage application.

The system dynamically determines the content and organization of web pages displayed to the user in order to guide the user toward successful completion of the author's desired goals. The components and organization of the web page content (described in greater detail below) are created by the author, for example in XML format, and are stored in various system databases.

In one embodiment, this content includes conceptual pages (e.g., an informational page with high-level descriptions of mortgages and links to other pages explaining different types of mortgages), classified into different author-created scenarios and including various navigational links among the pages. Intra-page content can include templates for laying out pages, page components, known as "stacks," which comprise major sections of a page (e.g., a section describing variable-rate loans), and intra-stack "content elements" (e.g., a loan application form) and "primitive objects" (e.g., a text field).

Authors can create content at various levels of abstraction, as well as "application rules" (also described in greater detail below) which dictate how the system will dynamically render that content to particular users, in order to effect the author's goals. Such rules can be interpreted directly by the system or embedded within particular content objects for interpretation only in the context of such objects.

A framework for one embodiment of such application rules is shown in FIG. 1, which illustrates the adaptive rendering of certain component content objects. Such rules effect certain goals or purposes 100 of an application author by directing the system to select particular content objects in response to certain static and dynamic conditions, such as user profile data and "application state" (e.g., a user's prior navigational behavior).

One such goal 100 might be, for example, to have a consumer complete a particular transaction (e.g., the online purchase of an item), to guide a user through a particular scenario (e.g., "Explore" scenario for particular products), or to have a consumer view certain content (e.g., a targeted advertisement for a particular product). The system includes content created by the author in the form of one or more dynamically-rendered (content) objects 110. Such objects 110 include both intra-page content (e.g., text, photo, video, audio) and inter-page content (e.g., next page, links to other pages), and can exist at virtually any level of abstraction (e.g., page, stack, content element, primitive object, etc.).

As shown in FIG. 1 for one embodiment of the present invention, the application rules cause the system to dynamically resolve three types of conditions to determine which content to render under particular circumstances to effect the author's goals. A particular application rule may include one or more of any or all of these three types of conditions, and may cause the system to resolve each such condition statically or dynamically (depending upon the structure of the rule and the context of particular conditions).

One type of condition determines why a user will receive particular content objects: i.e., which dynamically-rendered objects 110 most effectively satisfy the author's purpose 100 (which could include one or more sub-goals). For example, to direct users in an "explore" scenario toward variable-rate mortgage products, an author might want to present the user with choices for both fixed-rate and variable-rate products, but select more of the latter, or select those links to variable-rate products which are more likely to result in a purchase by the user (e.g., based on the cumulative actions of prior users).

As will be described below, the system can track the aggregate number of user clicks on an advertisement banner or other content object or web page component. This is one mechanism at the author's disposal for directing the system to resolve the "why" condition dynamically and select a desired content object implicitly, rather than having to create a separate static rule which explicitly references the desired content object.

A second type of condition determines who will receive particular objects: i.e., which users 140 will receive the particular dynamically-rendered objects 110 (referenced implicitly as described above for the "why" condition, or explicitly within the rule itself) based upon the satisfaction of one or more user conditions 120. User conditions 120 include user profile information, hardware and software platform and configuration data, and observed online behavior (e.g., interactions, navigation paths, etc.).

For example, certain content objects might be rendered only to male users exceeding a particular level of income, or possibly the subset of such users who previously clicked on a content object relating to variable-rate mortgage products (determined, for example, via an author-created "tag" on such object). As will be explained below, the system can track user behavior (individually and in the aggregate) at the client as well as the server, and then provide the author with a mechanism to create "user conditions" by combining such dynamic user behavior with user profile information and platform/configuration data.

A third type of condition determines when a user will receive particular objects: i.e., under what circumstances, as defined by application state 130, should particular dynamically-rendered objects 110 be delivered to particular users 140. Application state 130 can include virtually any runtime condition, not just information related to a particular user's profile or behavior.

For example, application state 130 can include aggregate user information (e.g., whether the user clicked on a "popular" link, determined by the aggregate number of daily clicks) or attributes of a content object (e.g., whether the object contains an image). The use of this dynamic application state 130 enables authors to create rules without having to know in advance (and explicitly specify in a rule) all conditions under which a dynamically-rendered object 110 will be rendered.

As noted above, in this embodiment, an author's application rule can include one or more of any or all of these three types of conditions. For example, an author might create the following rule for a sports-related web page:

"[i] When displaying a tennis-related web page (e.g., a web page containing two or more "tennis product" content elements and at least one "tennis advertisement" content element), [ii] include the most popular tennis shoe advertisement banner (where popularity is measured by the highest number of clicks by aggregate users during the past month) [iii] in web pages delivered to users with an annual income greater than $100,000 who, in this session, previously clicked on a sports-related advertisement banner."

In this example, clause [i] of the rule represents a "when" determination, with the application state 130 indicating whether the current page is "tennis-related." Clause [ii] of the rule represents a "why" determination, with the author's purpose 100 being the inclusion on tennis-related pages of the (currently) most popular tennis shoe ad. Clause [iii] of the rule represents a "who" determination, with the user conditions 120 including both an annual income in excess of $100,000 (user profile information) and a prior click in the current session on a sports-related ad (user behavior information).

As is evident from this example, the author of the application rules can combine these types of conditions (as well as other analogous types of conditions) in various ways to effect the author's goals by causing the system to dynamically resolve these conditions to determine which content should be rendered to which users under which circumstances.

System Architecture Overview

Figure 2:
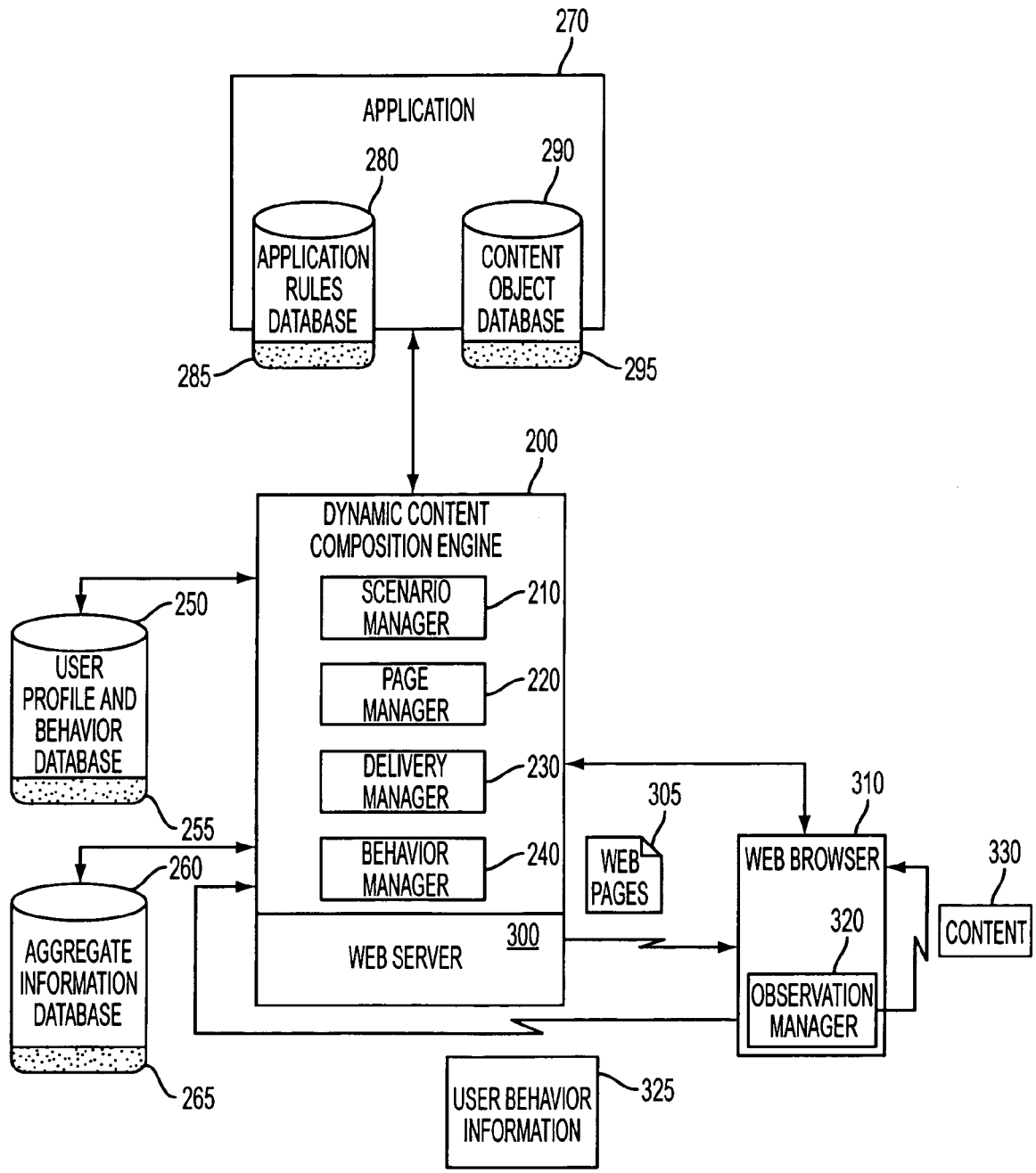
FIG. 2 shows the architecture of an embodiment of the present invention.

FIG. 2 illustrates the architecture of an embodiment of this invention. Application 270 includes content (including primitive content built into the system and content unique to the application created by an author/user of the system) and application rules (including both primitive rules built into the system and author-created rules). In one embodiment, each such application 270 is accessible via an online web site.

The author-created application rules are stored in application rules database 280, though some of these rules may also be stored as embedded rules (discussed below) within author-created content objects. A portion 285 of application rules database 280 includes a built-in system infrastructure including primitive rules (potentially applicable to any author-created application) written in a language implemented by the system (including various commands, system policies, and other attributes discussed below). This infrastructure is used by an application author to create rules unique to the author's application.

The author-created content objects are stored in content object database 290. A portion 295 of content object database 290 includes certain primitive objects and a built-in system infrastructure used by application authors to create a structural hierarchy of content objects (described below with reference to FIG. 3). These content objects, which in one embodiment are created in XML, include web pages (and their corresponding templates), stacks, content elements, and primitive objects. As will become apparent below, these content objects, when generated dynamically by dynamic content composition engine 200 (in accordance with various rules embedded in certain content objects or present in application rules database 280) provide users of the system with the experience of an author's application—e.g., being guided through the process of learning about, applying for and obtaining a mortgage.

Dynamic content composition engine 200 implements application 270 by interpreting the application rules, in the context of individual and aggregate user data stored in user profile and behavior database 250 and aggregate information database 260, to dynamically select, organize, and display content objects from content object database 290. User profile and behavior database 250 stores information regarding each user, including standard profile, demographic, and platform information, as well as observed behavioral information (e.g., interaction with portions of an application) that is updated dynamically during the user's interaction with the system. A portion 255 of user profile and behavior database 250 includes a built-in system database schema used by dynamic content composition engine 200 to organize and store the user profile and behavior information. Aggregate information database 260 includes aggregated data regarding both profile and behavioral information observed and otherwise collected over time from all (or selected subsets of) users of application 270 (and possibly across multiple applications). A portion 265 of aggregate information database 260 includes a built-in system database schema used by dynamic content composition engine 200 to organize and store the aggregate information.

Dynamic content composition engine 200 includes five "managers" that interpret the application rules, at runtime while the user interacts with the application, to make dynamic decisions as to which content objects will be displayed to the user. These decisions include which web pages are displayed at a particular time (e.g., a page in which a user applies for a loan, including a loan application form and various other information), the order in which particular web pages are displayed, and various decisions as to which components of a web page are included and how such components are organized. As will become apparent below, these component objects that are dynamically selected by the system, can range from discrete individual primitive objects (e.g., an icon or other image) to groups of objects (e.g., a form) and their layout on a web page, to a more abstract collection of conceptually related web pages that are selected in a particular order and delivered under certain conditions to effect one or more goals or purposes of an author.

These managers include, in one embodiment, the scenario manager 210, the page manager 220, the delivery manager 230, the behavior manager 240, and the observation manager 320 (which in this embodiment is located on the client, e.g., interacting with or embedded within the user's web browser). The functionality embodied in these various managers can of course be centralized within a single module or manager, or distributed among multiple managers, depending upon the particular implementation.

Figure 9:
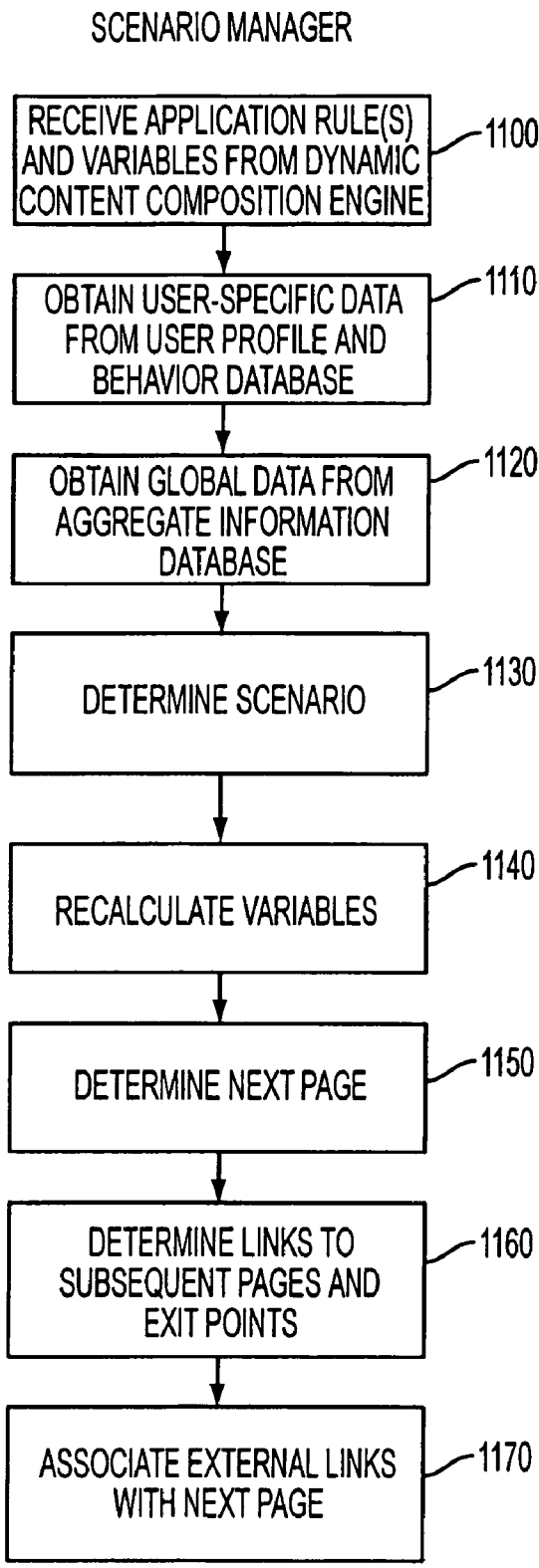
FIG. 9 shows a flowchart of the scenario manager in an embodiment of the present invention.

Scenario manager 210 (further described below with reference to FIG. 9) manages the dialogue between the system and the user as the user navigates through the pages of application 270. It interprets certain application rules, within the context of information extracted from current and prior users of the system, to determine dynamically which conceptual web page should next be delivered to which current users of the system, as well as which links to future web pages should be included on that page.

As will become apparent below, the system enables the author to create not only a collection of abstract web pages (independent of their internal content and organization), but also relationships among these pages (e.g., conditions under which they are displayed, often well beyond a simple sequential order) and organization into various "scenarios" (e.g., "Explore" or "Commit") indicating the author's goals in guiding users through certain collections of web pages. Ultimately, the path a user takes through these web pages will be determined not only by the user's actions (e.g., clicking on a particular link), but also by the choices which the system presents to the user dynamically (e.g., which links are included on a web page). These choices reflect various dynamic factors (e.g., the current scenario, the user's profile information and past behavior, as well as various system state information and aggregate user information reflecting, e.g., promising paths taken by prior users toward a goal desired by the application author) which are filtered automatically through the author's rules designed to effect certain goals (e.g., maximize the number of users that apply for loans, return to the site, fill out certain forms, or provide certain information).

Figure 10:
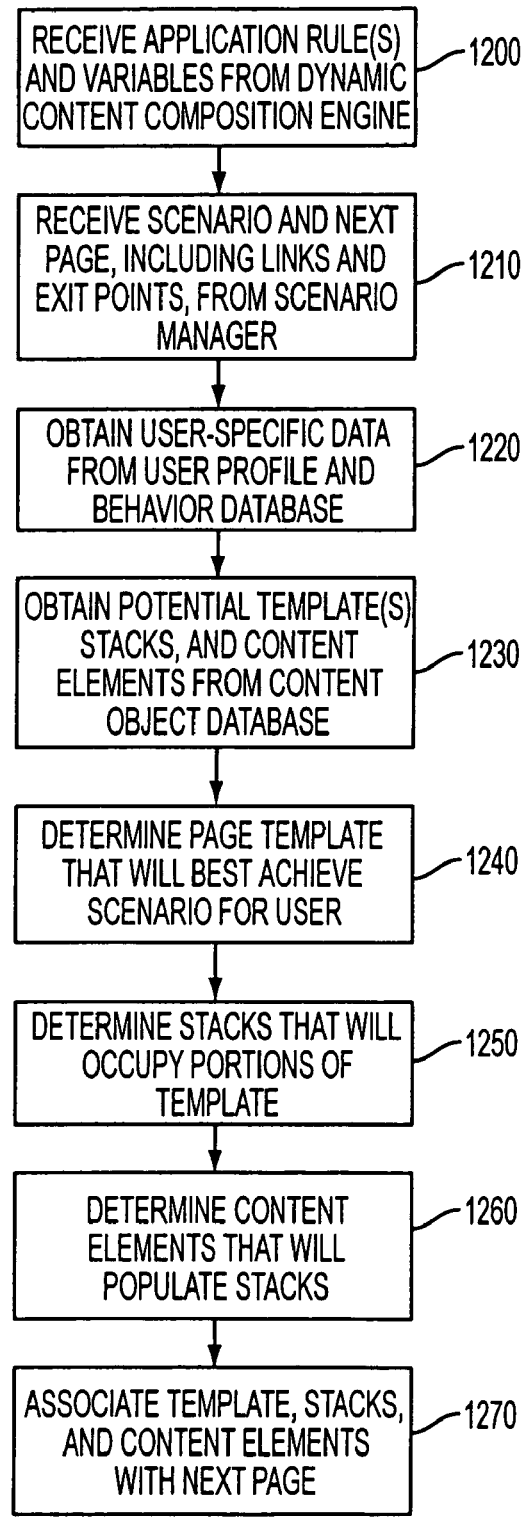
FIG. 10 shows a flowchart of the page manager in an embodiment of the present invention.

Page manager 220 (further described below with reference to FIG. 10) determines dynamically the organization and content of the web pages included within an application 270, including templates, stacks, and content elements. It accomplishes these tasks in part by interpreting (as does scenario manager 210) certain application rules within the context of information extracted from current and prior users of the system. Given a particular web page selected dynamically by scenario manager 210, page manager 220 determines dynamically the appropriate layout (e.g., template) of that page, including which content elements are organized into conceptual groups or stacks of content mapped onto a selected web page template. These dynamic decisions, though made at the "page level" (content within a page) rather than the more abstract "scenario" level" (across web pages), also take into account various dynamic factors reflecting system state information and other information extracted from current and prior users of the system.

As will be demonstrated below, the system enables an author to create rules that have consequences at one or more of these "levels." For example, a rule that determines the conditions under which a particular web page will be displayed would be interpreted by scenario manager 210, whereas a rule that selects one of various types of loan forms would be interpreted by page manager 220. Certain rules might of course affect multiple of these "levels," and thus be interpreted by multiple managers.

Figure 11:
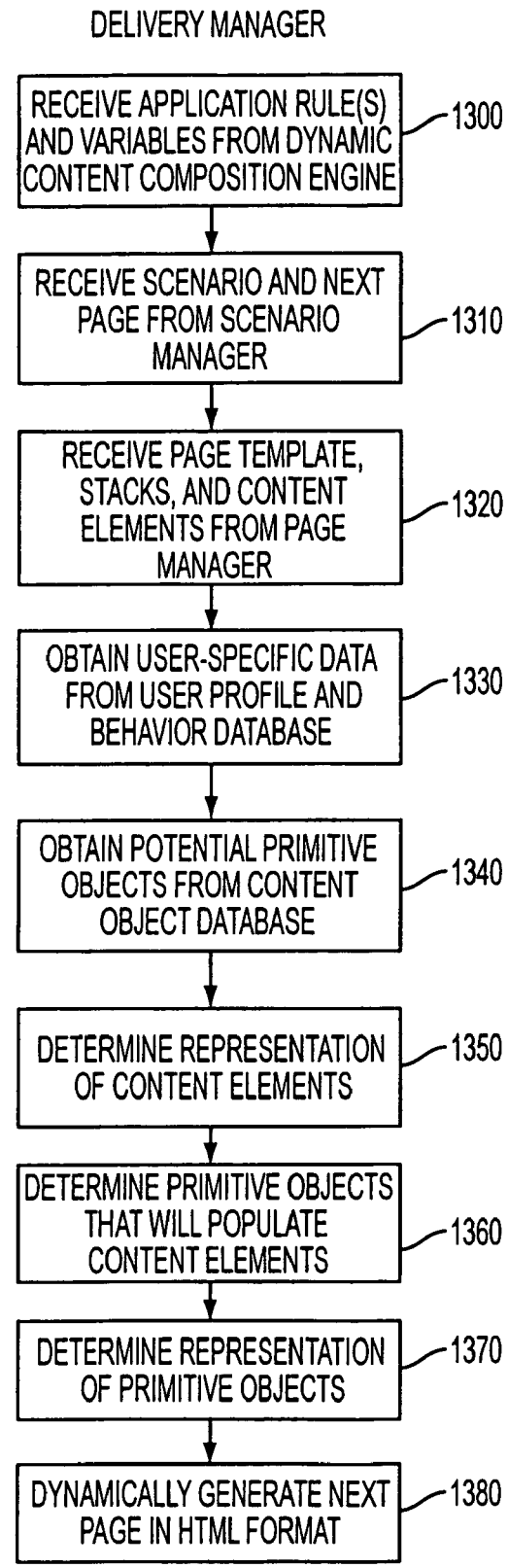
FIG. 11 shows a flowchart of the delivery manager in an embodiment of the present invention.

Delivery manager 230 (further described below with reference to FIG. 11) determines the specific representation of certain content selected dynamically by page manager 220 (e.g., in one embodiment, the selection of which of various alternative primitive objects make up a content element). Delivery manager 230 makes relatively more concrete dynamic decisions than does scenario manager 210 or page manager 220 (though also by interpreting application rules in the context of system state and individual/aggregate user information), such as whether a content element should be displayed as static text, or as an animated image or video. Such decisions might be based on a user's platform or bandwidth, as well as on a user's previously determined preference or response to certain different types of media content. In addition to making such decisions, delivery manager 230 also is responsible for converting the XML content stored in content object database 290 (and selected dynamically by various managers) into the actual HTML web pages 305 that are transmitted by web server 300 (via the standard HTTP protocol) to a particular user for display in the user's client web browser 310. In other embodiments, of course, different page formats and communication protocols could be employed.

Figure 12:
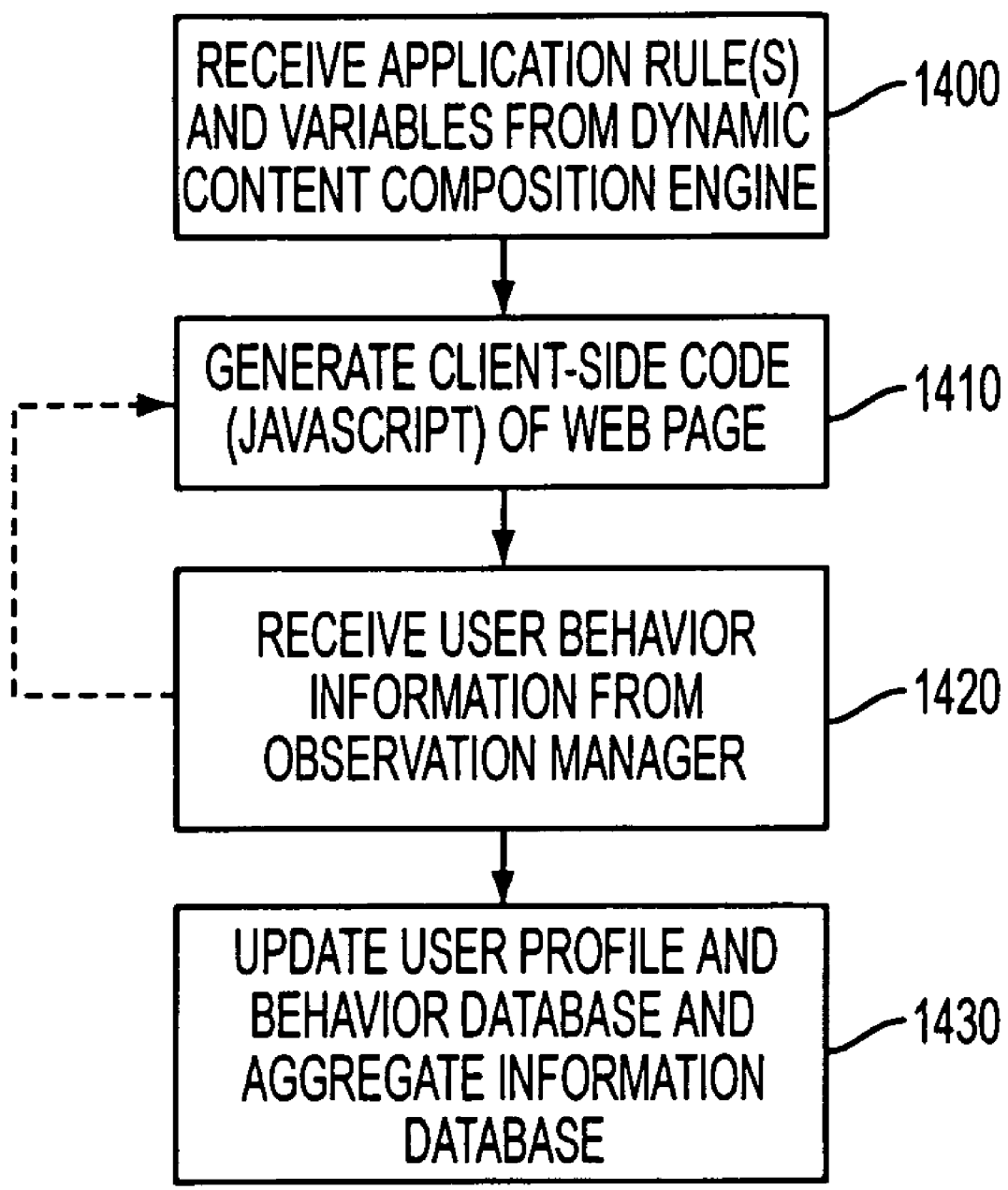
FIG. 12 shows a flowchart of the behavior manager in an embodiment of the present invention.
Figure 13:
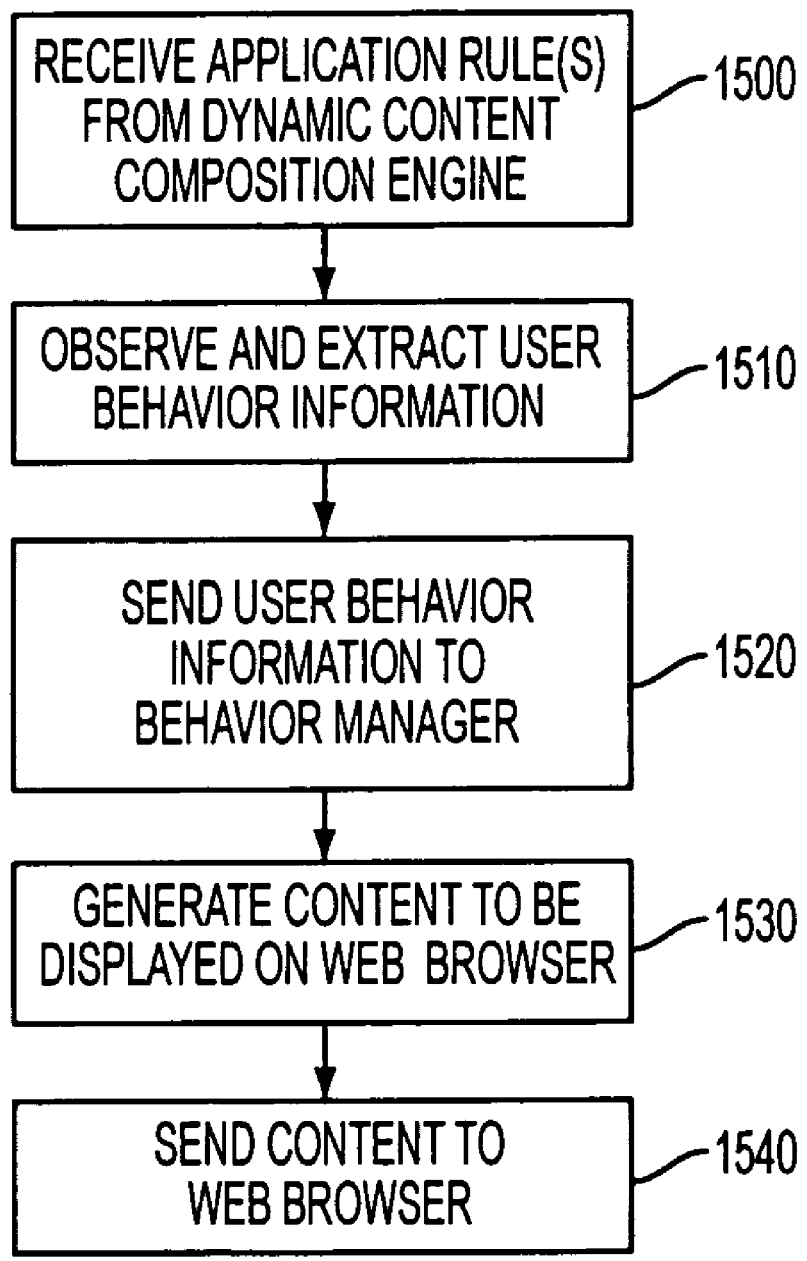
FIG. 13 shows a flowchart of the observation manager in an embodiment of the present invention.

Behavior manager 240 (further described below with reference to FIG. 12) works with observation manager 320 (on the client side and further described below with reference to FIG. 13) to supplement the HTML generated by delivery manager 230 with client-side code (e.g., JavaScript) that will monitor user behavior and make client-side dynamic decisions to display (and possibly obtain from the server) certain content 330. Behavior manager 240 also interprets certain application rules in the context of system state and individual/aggregate user information, though it does so primarily for the purpose of selecting content objects that will monitor user behavior. It generates dynamically certain client-side code (e.g., converting XML objects into JavaScript code) that will perform this monitoring function, as well as code that will itself utilize the behavioral information extracted dynamically from the user to select content 330 to be displayed. Such alternative content might be delivered in advance (e.g., by delivery manager 230) so that it can selectively be displayed without requiring further communication with web server 300. Alternatively, such content could be obtained by requesting subsequent delivery of content objects (e.g., via standard HTTP requests), and perhaps even by delegating such decisions back to behavior manager 240.

Observation manager 320, which is located on the client (and functions with or as part of the user's web browser 310), records and extracts user behavior information 325 (e.g., user mouse movements or selection of certain content objects, or even the passage of time in a particular context) in accordance with the code generated by behavior manager 240, and delivers such information back to dynamic content composition engine 200 for updating of user profile and behavior database 255 and aggregate information database 260. Observation manager 320 may also participate in the dynamic generation of certain content 330 displayed on web browser 310.

System Components

1. Content Object Database

As shown in FIG. 2, in an embodiment of this invention, content object database 290 includes both primitive objects and a built-in system infrastructure used by application authors to create a structural hierarchy of content objects, which may be in XML format. This infrastructure includes "field schema" or pre-generated field definitions for various types of predefined objects (described below).

The content objects exist at various levels of abstraction, as described below and illustrated in FIG. 3. The author need only define conceptual pages and various links among them, along with alternative intra-page content at any desired level of detail. With relatively few application rules, the system can determine dynamically (and automatically), despite the existence of a large number of combinations of potential web pages (often exceeding millions of combinations for even moderately complex applications), which content objects to display to particular users (including conversion of such content objects into actual HTML web pages. As will be discussed below, the application rules can reference these content objects at various levels of abstraction, from abstract groups of pages down to individual text fields.

a. Pages

In one embodiment, the most abstract level of content objects is the page 400 (although pages can be grouped into "scenarios" which are used as parameters to the application rules). The page 400 is a conceptualization of the collection of lower-level content objects that ultimately may be rendered as one of many possible HTML web pages.

A page 400 is thus often defined independent of its particular contents. For example, a page might be represented conceptually as a "loan application" page. Yet, it might include any one of multiple different types of loan application forms (e.g., mortgage, unsecured auto loan, etc.), each of which constitutes a lower-level content object that belongs to that page 400 in the content object hierarchy.

Figure 3:
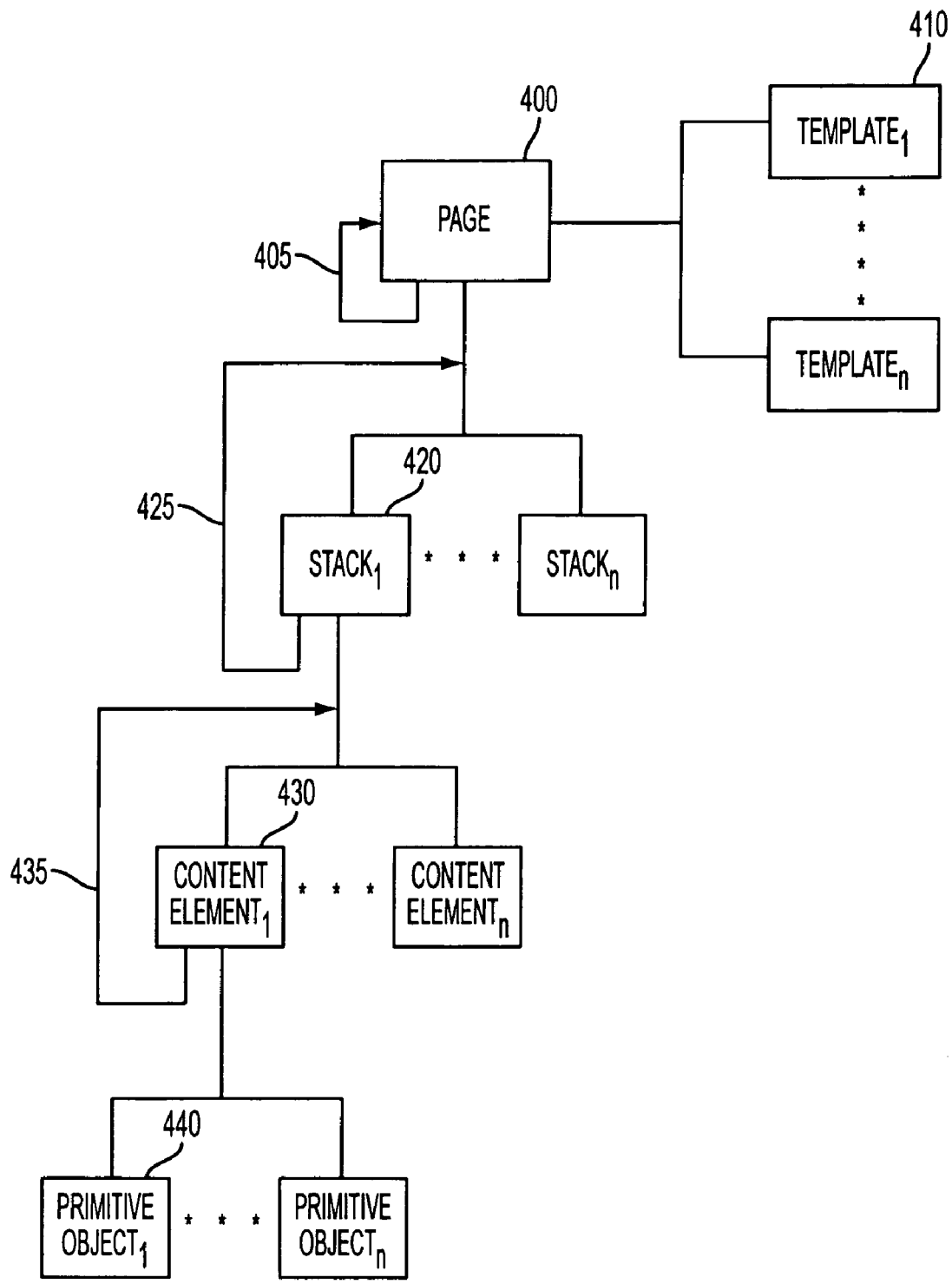
FIG. 3 shows the content object hierarchy in an embodiment of the present invention.
Figure 3A:
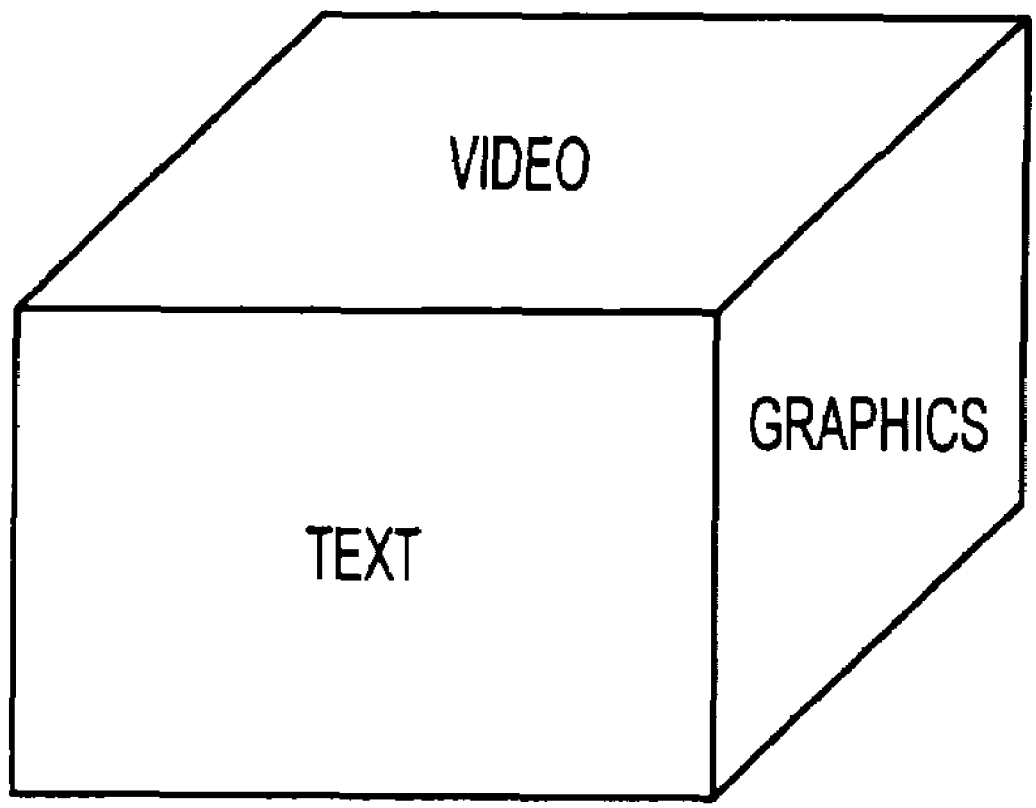
FIG. 3(a) shows the representations of a content element in an embodiment of the present invention.

In this embodiment, illustrated in FIG. 3, each page 400 consists of one or more stacks 420, which in turn consist of one or more content elements 430, which in turn consist of one or more primitive objects 440. A page 400 may include one or more other pages (relationship 405), for example, such that one page permits scrolling down through one or more other pages, without using the "back" or "forward" buttons of the user's web browser. A page 400 is dynamic not only because the system can select the page at run time from among multiple alternative pages, but also because the stack(s) 420 that comprise the selected page 400 (as well as their component content objects) also can be determined dynamically by the system at run-time.

Figure 4:
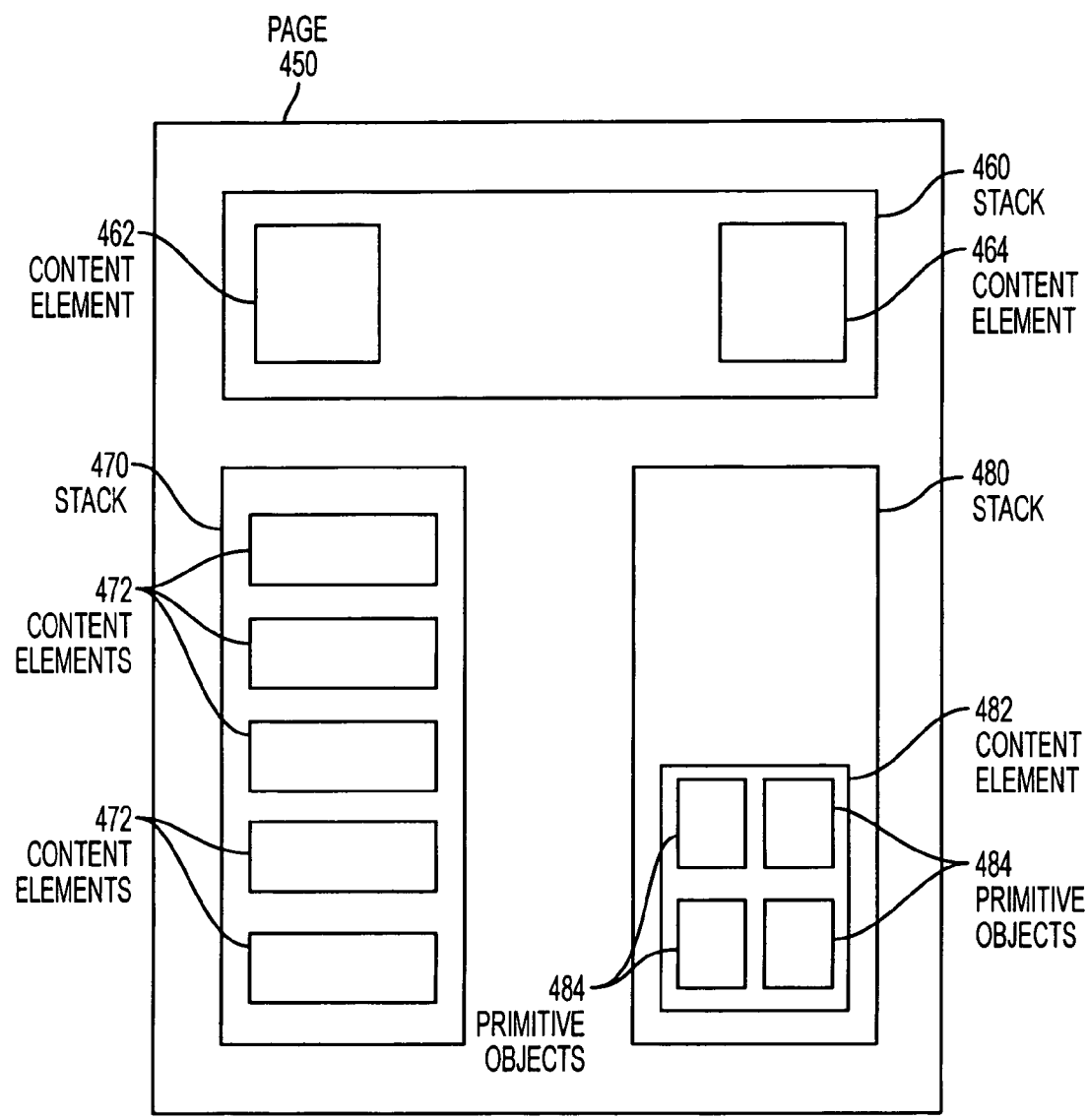
FIG. 4 shows the structure of a hypothetical web page template in an embodiment of the present invention.

Each page 400 can have one or more templates 410, each of which is stored in content object database 290. Templates 410 are designed by the application author as different "maps" of the same page 400. Template 410 is used to determine the size and location of certain content objects that comprises the page 400. For example, FIG. 4 shows a template for hypothetical web page 450. This template includes and maps out the location of stacks 460, 470, and 480. Stack 460 includes content elements 462 and 464. Stack 470 includes content elements 472. Finally, stack 480 includes content element 482, which in turn includes primitive objects 484.

A page may have multiple templates so that the application can accommodate different user "modes" with tailored form and presentation of content. By implementing application rules, the system can dynamically determine such modes and select the appropriate template, for example, in response to certain user characteristics including profile, behavior, and platform. For example, an application might include the following modes: (i) "normal" mode, whereby a first-time user receives a version of a page containing a limited number of fields and a moderate level of help for the fields; (ii) "education" mode, whereby a user who requests help more than twice or incorrectly fills out a certain number of fields receives a version of the page containing a limited number of fields and more extensive help (than in "normal" mode) that is automatically displayed; (iii) "power" mode, whereby a user returning to the page receives many more fields per page and minimal help information relative to a first-time user, in order to speed-up completion; and (iv) "error" mode, whereby additional narrative is displayed around errors for certain users who the system determined need additional help information.

Figure 5A:
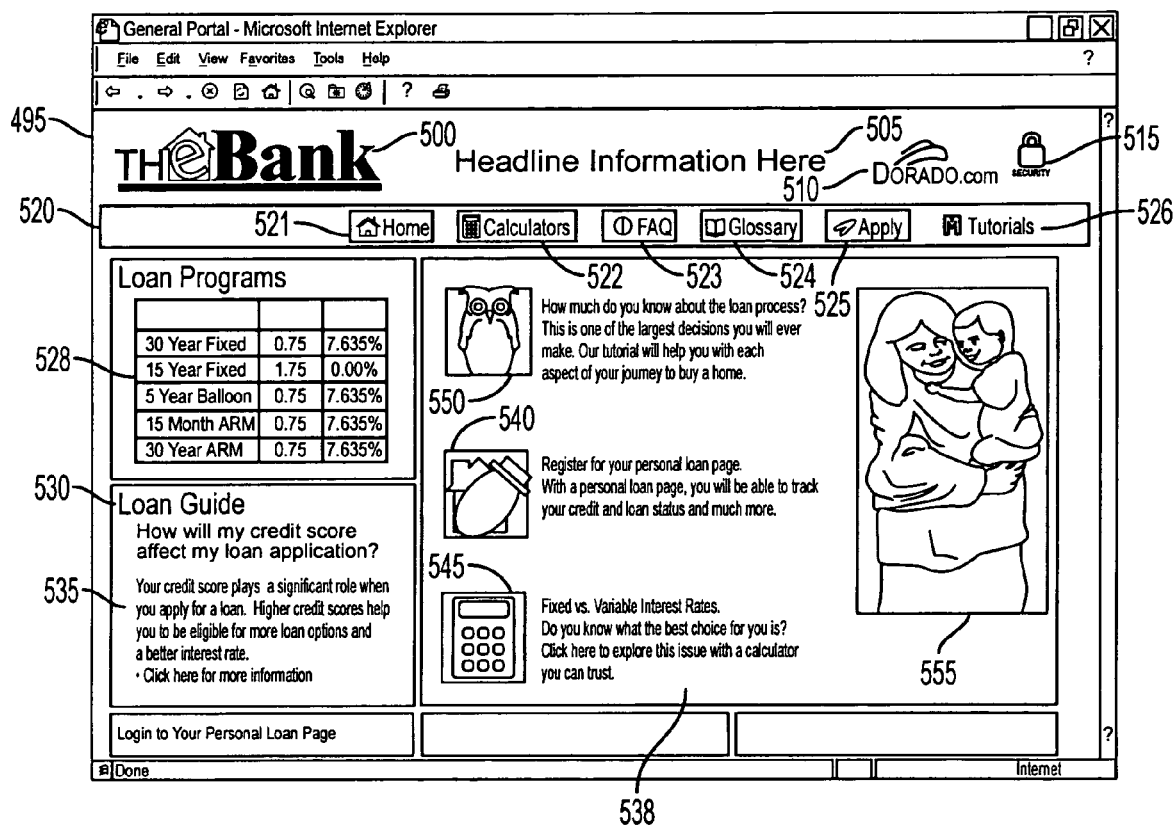
FIG. 5(a) shows a screenprint of a web page in an embodiment of the present invention.
Figure 5B:
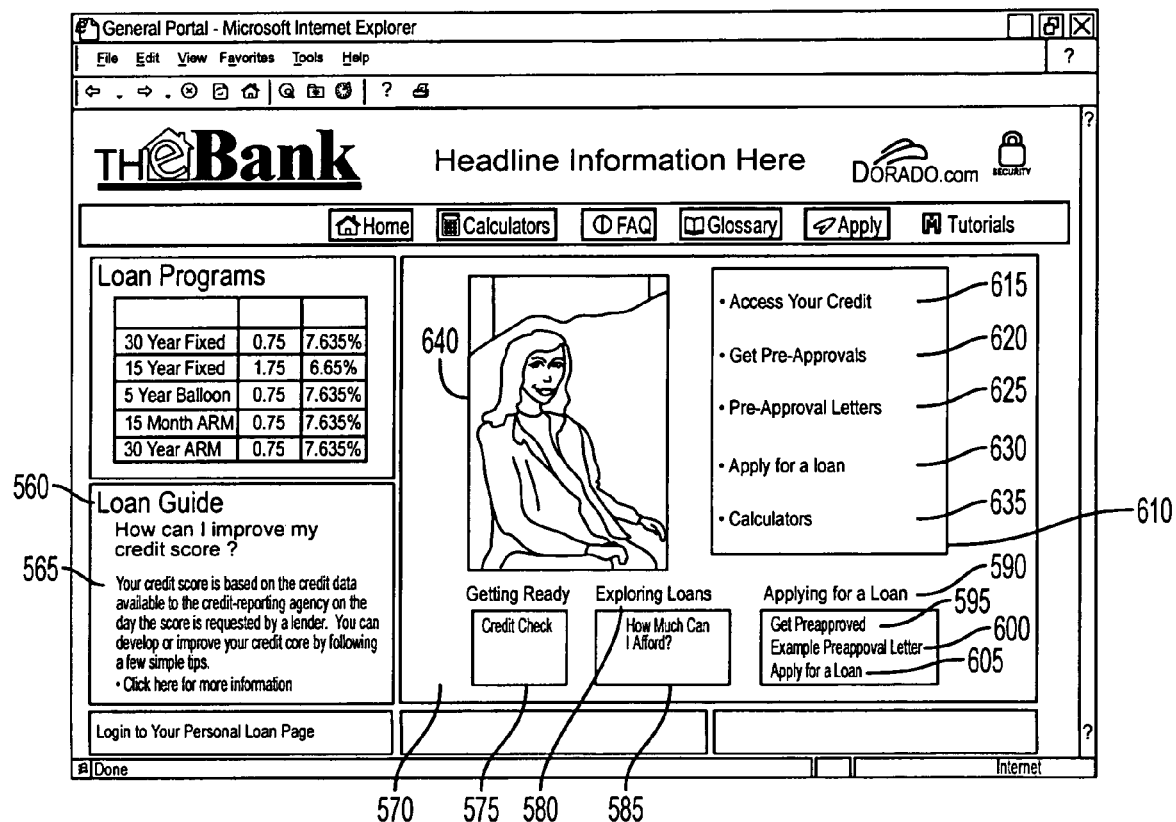
FIG. 5(b) shows a screenprint of another web page in an embodiment of the present invention.
Figure 5C:
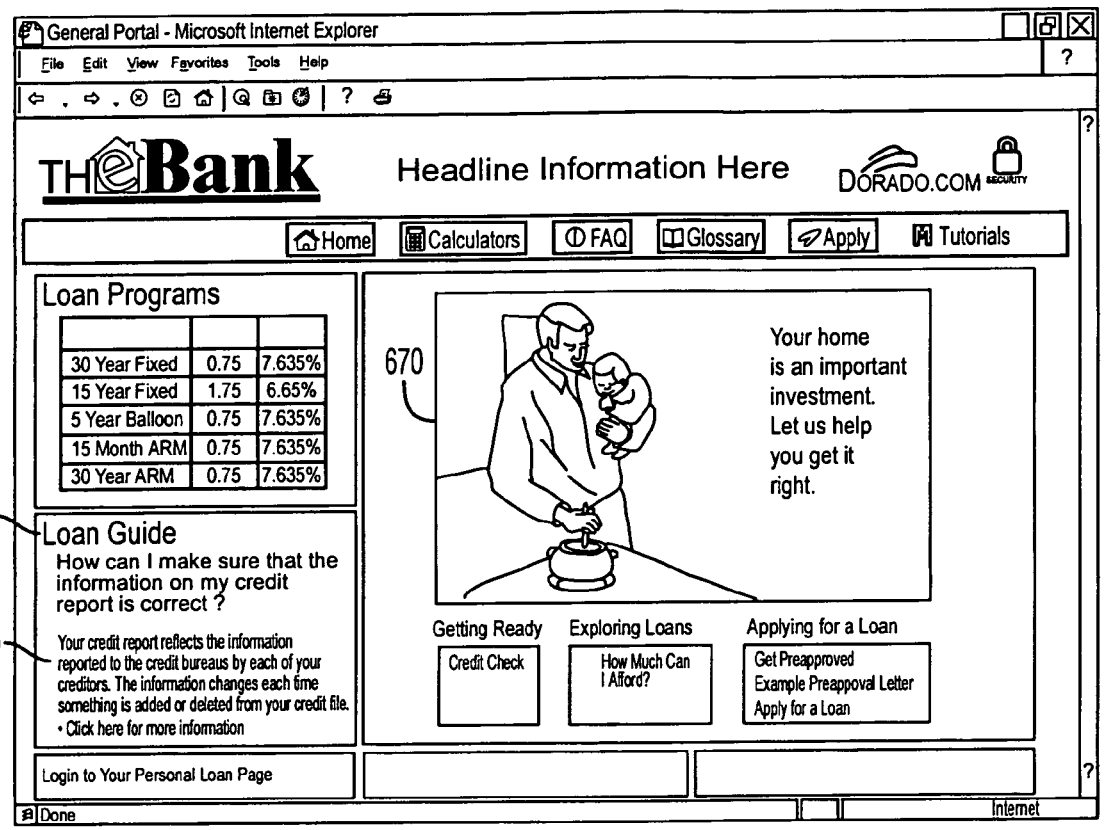
FIG. 5(c) shows a screenprint of another web page in an embodiment of the present invention.

FIGS. 5(*a*)-(*c*) show screenprints of different web pages from a mortgage application in an embodiment of the present invention. Each of these pages represents a different dynamically-generated version of the same page for different types of users identified by the system.

FIG. 5(*a*) shows a version of the page for a user who is unfamiliar with the mortgage loan process. The page includes introductory information about credit scores ("Loan Guide" display 530) and highlights mortgage loan tutorials (550) and calculators (545).

FIG. 5(*b*) shows a version of the same page for a user who does not need the introductory information to be highlighted. The page version shown in FIG. 5(*b*) provides the user with more advanced information regarding credit score ("Loan Guide" display 560) than the version shown in FIG. 5(*a*), and also provides the user with multiple ways of accessing the same information. For example, clickable text fields 615, 620, 625, 630 & 635 provide links to the same information as clickable text fields 575, 595, 600, 605 & 585, respectively.

FIG. 5(*c*) shows a version of the same page for a more advanced user. The page version shown in FIG. 5(*c*) provides the user with a higher degree of information regarding credit score ("Loan Guide" display 650) than the version shown in FIG. 5(*b*), and does not provide the user with multiple ways of accessing the same information.

Figure 6A:
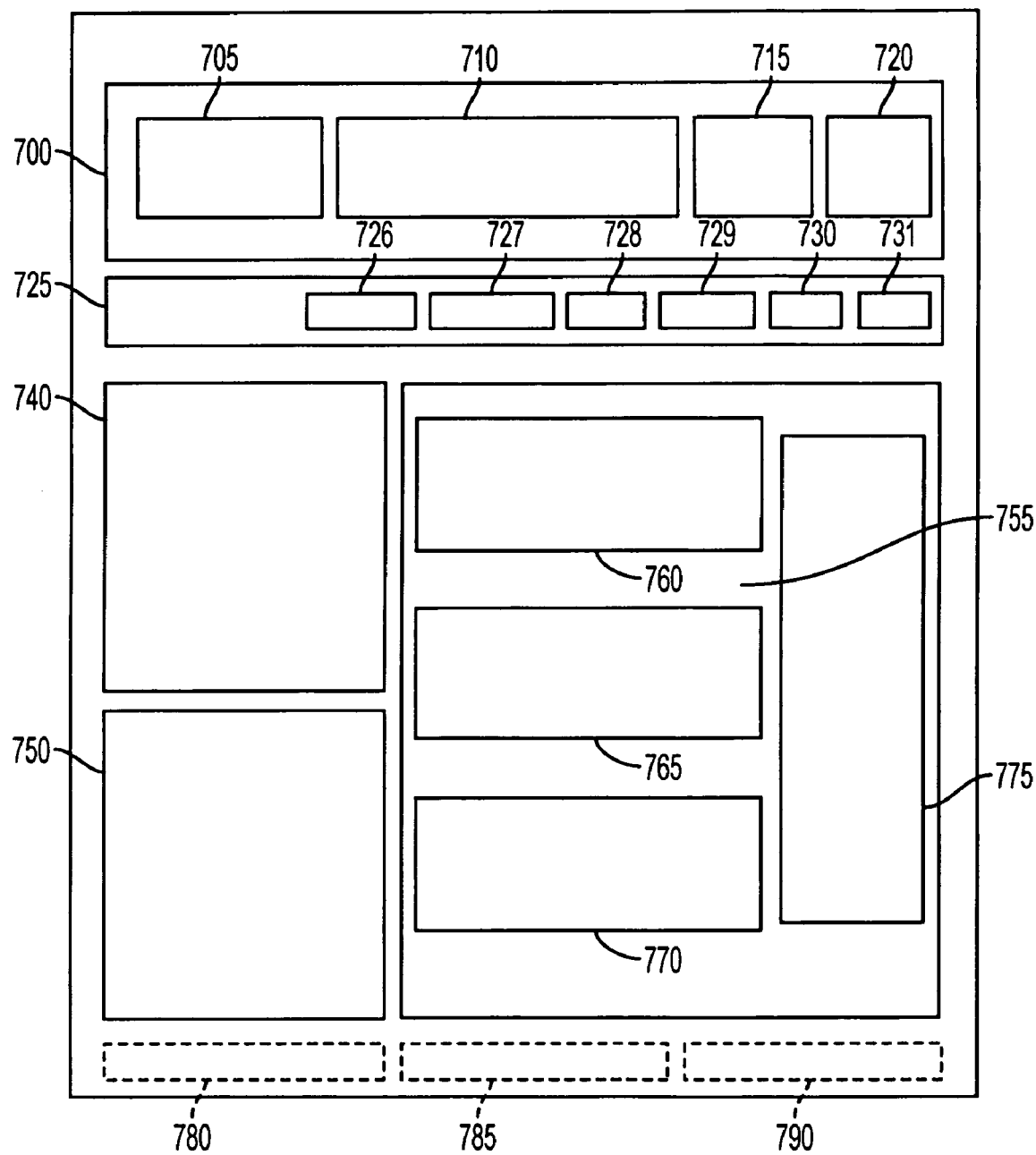
FIG. 6(a) shows the template of the web page shown in FIG. 5(a) in an embodiment of the present invention.
Figure 6B:
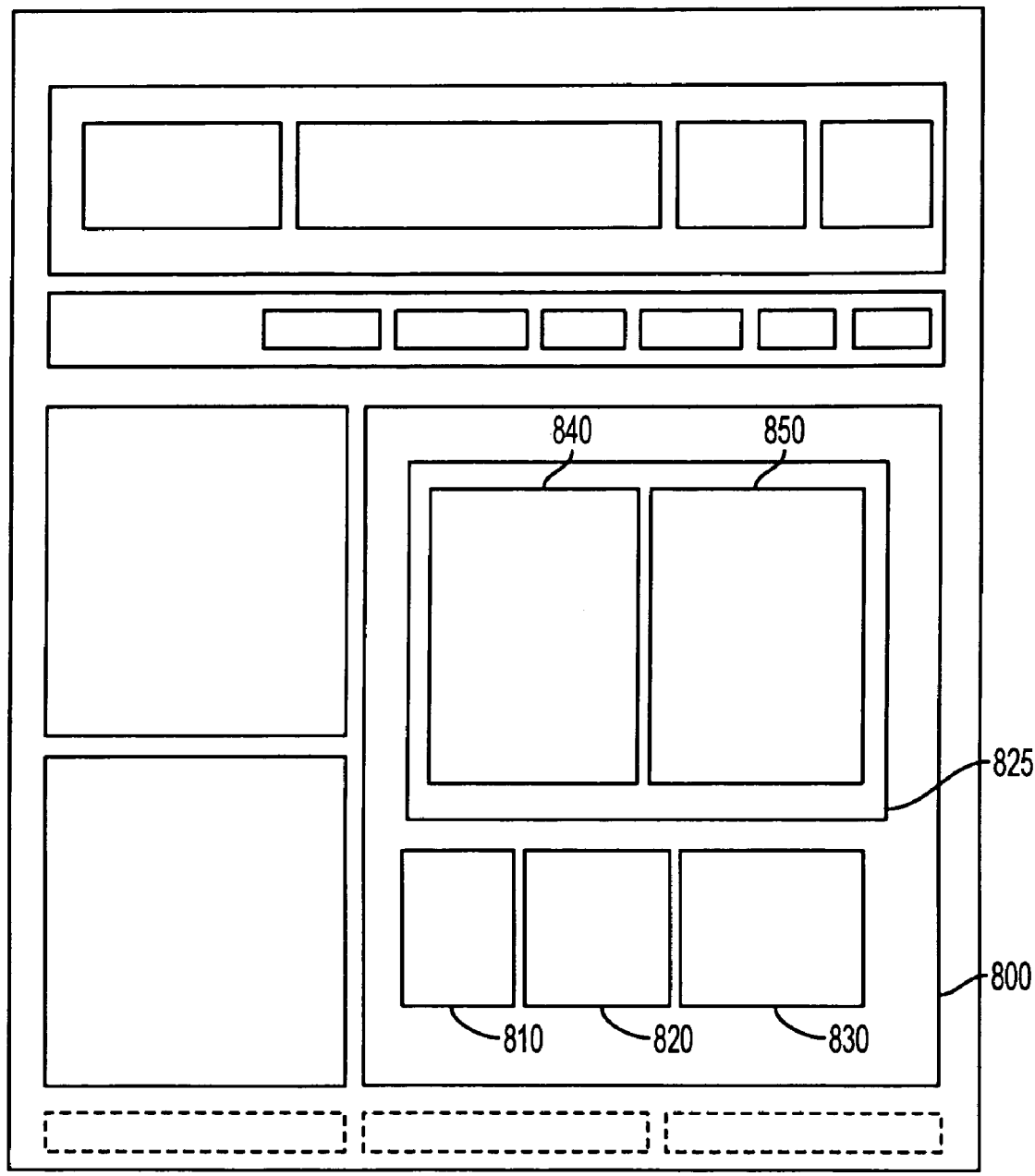
FIG. 6(b) shows the template of the web pages shown in FIGS. 5(b)-(c) in an embodiment of the present invention.

FIGS. 6(*a*) and (*b*) show the templates of the web pages shown in FIGS. 5(*a*) and 5(*b*)-(*c*), respectively. The templates lay out the location of the different content objects (stacks, content elements, primitive objects) that comprise particular versions of the same page. The templates of the example web pages differ in that the template shown in FIG. 6(*a*) (which is a template for the page shown in FIG. 5(*a*)) includes a stack 755 having content elements 760, 765, 770 and 775, while the template shown in FIG. 6(*b*) (which is a template for the pages shown in FIGS. 5(*b*) & (*c*)) includes a stack 800 having content elements 810, 820, 830, 840 and 860. Note that the stacks and content elements of the two templates have different sizes and layouts.

b. Stacks

As shown in FIG. 3, the next level of content objects is the stack 420. The stack 420 is the content object that comprises the "building blocks" of pages 400. Each stack 420 consists of one or more content elements 430, which in turn consist of one or more primitive objects 440. A stack 420 may include one or more other stacks (relationship 425). Stacks may be designed and created by the application author or "built-in" to the system for use across multiple applications. As noted above for page 400, stack 420 is dynamic not only because it can be selected at run time, but also because the content element(s) 430 and/or primitive object(s) 440 that comprise the selected stack 420 also can be determined dynamically by the system at run-time.

Examples of stacks 420 can be found in the screenprints of the example web pages shown in FIGS. 5(*a*)-(*b*). In FIG. 5(*a*), the stacks include the following: banner area 495 (stack 700 of the template shown in FIG. 6(*a*)); toolbar 520 (stack 725 of the template shown in FIG. 6(*a*)); "Loan Programs" display 528 (stack 740 of the template shown in FIG. 6(*a*)); "Loan Guide" display 530 (stack 750 of the template shown in FIG. 6(*a*)); and mortgage information area 538 (stack 755 of the template shown in FIG. 6(*a*)). Other examples of stacks 420 include the mortgage application form that will be displayed when the user clicks "Apply" button 525. In FIG. 5(*b*), the stacks include the same stacks as described in FIG. 5(*a*), except that mortgage information area 538 is replaced by mortgage information area 570 (stack 800 of the template shown in FIG. 6(*b*)).

c. Content Elements

As shown in FIG. 3, the next level of content objects is the content element 430. Each content element 430 may include one or more primitive objects 440, e.g., multiple fields or icons. A content element 430 also may include one or more other content elements (relationship 435). Content elements may be designed and created by the application author or "built-in" to the system for use across multiple applications. A content element 430 can be selected dynamically at run time from among alternative content elements, along with the primitive object(s) 440 that comprise the content element 430, e.g., an address field content element might include "Country" if an "international" status indicator was set for a particular user.

A content element 430 may be represented by one of multiple alternative "cubes," selected, for example, based on the user's current scenario, with each "cube" having multiple representations or "cube faces," which can be directed to particular users, e.g., based on user profile, behavior, mode, and/or platform information. For example, as shown in FIG. 3(*a*), a content element 430, such as an advertisement, may have text, video, and graphic representations. Based on the current scenario, particular application rules, and user information, the delivery manager (230 in FIG. 2) will dynamically decide at run-time which version and representation to present to a particular user. For example, the system may present the video representation to a user with a high bandwidth platform, while a user with a low bandwidth platform will receive a text representation.

Examples of content elements 430 can be found in the screenprints of the example web pages shown in FIGS. 5(*a*)-(*c*). In FIG. 5(*a*), the content elements include the following: "How much do you know about the loan process?" icon and text display 550 (content element 760 of the template shown in FIG. 6(*a*)); "Register for your personal loan page" icon and text display 540 (content element 765 of the template shown in FIG. 6(*a*)); "Fixed vs. Variable Interest Rates" icon and text display 545 (content element 770 of the template shown in FIG. 6(*a*)); and graphic 555 (content element 775 of the template shown in FIG. 6(*a*)). In FIG. 5(*b*), the content elements include the following: "Getting Ready" text display 570 (content element 810 of the template shown in FIG. 6(*b*)); "Exploring Loans" text display 580 (content element 820 of the template shown in FIG. 6(*b*)); "Applying For a Loan" text display 590 (content element 830 of the template shown in FIG. 6(*b*)); graphic 640 (content element 840 of the template shown in FIG. 6(*b*)); and mortgage option menu 610 (content element 850 of the template shown in FIG. 6(*b*)). An additional content element in FIG. 5(*c*) is graphic and text display 670 (content element 825 of the template shown in FIG. 6(*b*)).

d. Primitive Objects

As shown in FIG. 3, the lowest level of content objects is the primitive object 440. Primitive objects 440 include static "media" objects, such as text, audio, or video, as well as dynamic "field" objects that permit user interaction, such as fields for text entry or any object that permits interaction via a user's keystroke mouse click, e.g., an interactive icon or link.

A field object may include a "content-embedded rule" within the object to facilitate user interactions. For example, such a primitive object 440 can examine the user environment and make an observation to be used by that field object or another field object. Primitive objects 440 can be Java objects and are typically "built-in" to the system for use across multiple applications (though application authors could extend the system by designing new primitive objects).

In one embodiment, each primitive object 440 includes the following attributes: "type," e.g., text, audio, video, etc.; "tag," e.g., object name, maximum length, font, required status, etc.; and "points," i.e., an associated weight that can be used by the application to assist various dynamic selections. Using application rules, points can be assigned to primitive objects based on purpose, importance, bandwidth usage, size, content, etc. A rule can limit the number of points that can be included within a particular content element, stack, or page, thus assisting the system in its dynamic determination of web page content for particular users.

Examples of primitive objects 440 can be found in the screenprints of the example web pages shown in FIGS. 5(*a*)-(*b*). In FIG. 5(*a*), the primitive objects include the following: "eBank" logo 500 (primitive object 705 of the template shown in FIG. 6(*a*)); "Dorado" logo 510 (primitive object 715 of the template shown in FIG. 6(*a*)); "secure web site" icon 515 (primitive object 720 of the template shown in FIG. 6(*a*)); and toolbar icons/links 521-526 (primitive objects 726-731 of the template shown in FIG. 6(*a*)). In FIG. 5(*b*), the primitive objects include the following: "Credit Check" link 575; "How Much Can I Afford?" link 585; "Get Preapproved" link 595; "Example Preapproval Letter" link 600; and "Apply For a Loan" link 605.

2. User Profile and Behavior Database

As shown in FIG. 2, in an embodiment of this invention, the system includes user profile and behavior database 250. The user profile and behavior database 250 stores user profile data regarding each user, including personal, demographic, and platform information, as well as observed behavior and interaction information that is dynamically updated during the user's interactions with the system. Such information is organized and stored using the system-provided database schema that is stored in portion 255 of user and profile behavior database 250. Behavior manager 240 determines which dynamic behavioral information will be stored in user and profile behavior database 250.

The user profile and behavior information comprises several categories of data: standard profile information, demographic information, platform information, and behavior and interaction information. In one embodiment, standard profile information includes the user's name, street address, city, state, zip code, telephone number, fax number, and electronic mail address. Demographic information includes the user's age, gender, occupation, income, education level, and any other descriptive information that can be used to categorize the user. Platform information includes client-side data regarding the user's computing environment that the system obtains when the user first enters the application, such as: browser type and version, operating system, hardware platform, bandwidth, available plug-ins, screen color depth, and JavaScript version (if Java-enabled). Note that most of the platform information is static, but some, such as bandwidth, is observed dynamically throughout a user's session.

Behavior and interaction information includes system-observed and -recorded data regarding a user's behavior and preferences while using the system, including: elapsed time spent viewing particular content objects (e.g., pages, stacks, content elements, and/or primitive objects); list of content objects clicked on; movement of mouse over particular content objects; areas of particular templates where user spent the most time; page hits; previously-visited pages; next page within scenario; traversed navigation paths; etc. In addition, the system records session state data, e.g., information regarding the page from which the user exited the application, which enables the user to resume a session later without having to re-enter information.

3. Aggregate Information Database

As shown in FIG. 2, in an embodiment of this invention, the system includes aggregate information database 260. The aggregate information database 260 stores information compiled regarding application users as a whole, including demographic information, as well as observed behavior and interaction information that is dynamically updated during users' interactions with the system. Such information is organized and stored using the system-provided database schema that is stored in portion 265 of aggregate information database 260. Behavior manager 240 determines which dynamic aggregate information will be stored in aggregate information database 260.

The demographic information includes aggregated data regarding users' ages, genders, occupations, income, education levels, and any other descriptive information that can be used to categorize users. Such information can be tracked in relation to users' choices and actions during their online sessions in the application. For example, the system can track which pages were selected most often as the next page from a particular point by 35-year-old males with a college education. Such information could be used, for example, by scenario manager 210 in determining next page links for a user in the same application with a similar demographic background.

4. Application Rules Database

As shown in FIG. 2 and discussed above for one embodiment of this invention, the system includes application rules database 280 for storing application rules created by the author of an application. In this embodiment, these rules are interpreted by dynamic content composition engine 200 as part of its execution of the application 270. Other application rules (and possibly all application rules) may be embedded in particular content objects, stored in content object database 290, also for execution by dynamic content composition engine 200, but only in the specific context of such content objects.

The application rules are created by the application author using the system-provided infrastructure, policies, and language stored in portion 285 of application rules database 280. By determining dynamically at runtime which content objects will be delivered to particular users, the system provides a mechanism for application authors to simulate an automated dialogue with users—i.e., by determining (via application rules) the conditions under which content objects are rendered. These rules are created by authors to dictate the dynamic selection of some or all levels of content objects, including pages, page templates, stacks, content elements and primitive objects.

As described above and shown in FIG. 1, the system interprets the application rules to perform the adaptive rendering inherent in this invention in order to satisfy the author's goals—as if the author were engaged in a dialogue with the user throughout the user's session. In one embodiment, each application rule can direct the system to select dynamically particular content objects to be rendered to the user—by determining dynamically whether one or more of any or all of the following conditions is satisfied: (i) why a user will receive particular content objects—i.e., which objects most effectively satisfy the author's purpose as specified in the rule; (ii) who will receive such objects—i.e., which users satisfy the user profile, platform and/or behavioral conditions specified in the rule; and (iii) when will such users receive such objects—i.e., under what circumstances (application state) will such objects be delivered to such users.

As noted above, application rules can result in the adaptive rendering of content objects at any level of abstraction. For example, an author's purpose (regarding a why condition) could be to render the most popular page (determined by aggregate access to various alternative pages over some time period), or the most popular stack, content element or primitive object (determined by aggregate mouse clicks on such content object, or on a content object contained therein).

Moreover, application rules can include conditions that reflect attributes of, or events relating to, content objects at various levels of abstraction. For example, user behavior (regarding a who condition) might reflect a user's prior mouse click on a page, or on some component of that page, such as a stack, content element, or primitive object. Similarly, application state (regarding a when condition) might reflect the state (e.g., "tennis-related") of a page, or of a component of that page (e.g., a "tennis ad" content element), or even the user's current scenario.

Particular application rules may be interpreted by one or more managers (scenario 210, page 220, delivery 230, behavior 240) of dynamic content composition engine 200 shown in FIG. 2. By interpreting the applicable rules, the particular managers determine dynamically which content objects to render to particular users.

The rules can be encoded in various languages (e.g., a user-friendly scripting language, such as Visual Basic), typically including common constructs such as "if-then" dependencies (e.g., if user matches at least two profile characteristics then display stack X), Boolean (e.g., inclusive and exclusive) relationships, and various loop constructs. For example, an inclusive relationship might always display content element Y when user conditions A and B are met; whereas an exclusive relationship might only select video or graphic primitive objects, but not both, to populate stack X.

Application rules (or portions thereof) also may be classified into a number of categories. For example, referring to FIG. 3, "scenario-specific" rules determine which pages 400 are rendered within a particular scenario (e.g., which page to render after the user presses a "submit" or similar button on the current page, as well as which external links to other pages should be included on the current page). "Page-specific" rules determine which template 410 to use for a particular page 400, as well as which stacks 420 to include within the page. "Stack-specific" rules determine which content elements 430 to include within a particular stack 420. "Content-element-specific" rules determine which primitive objects 440 to include within a particular content element 430, as well as which representation of the content element to implement. "User-specific" rules include application rules that make content determinations based on a particular user's profile and behavior data "Multi-user" rules include application rules that make content determinations based on aggregate information for a population of users.

As discussed below, the managers of dynamic content composition engine 200 parse the application rules dynamically to determine the extent to which decisions must be made at their level of abstraction. For example, scenario manager 210 might be invoked after a user presses a "submit" button on the current page. Upon detecting a why condition in an application rule (e.g., a rule that selects a page content object), it might further parse that rule by evaluating the condition to determine the "author's purpose" and thereby select the next page to be rendered.

Figure 7:
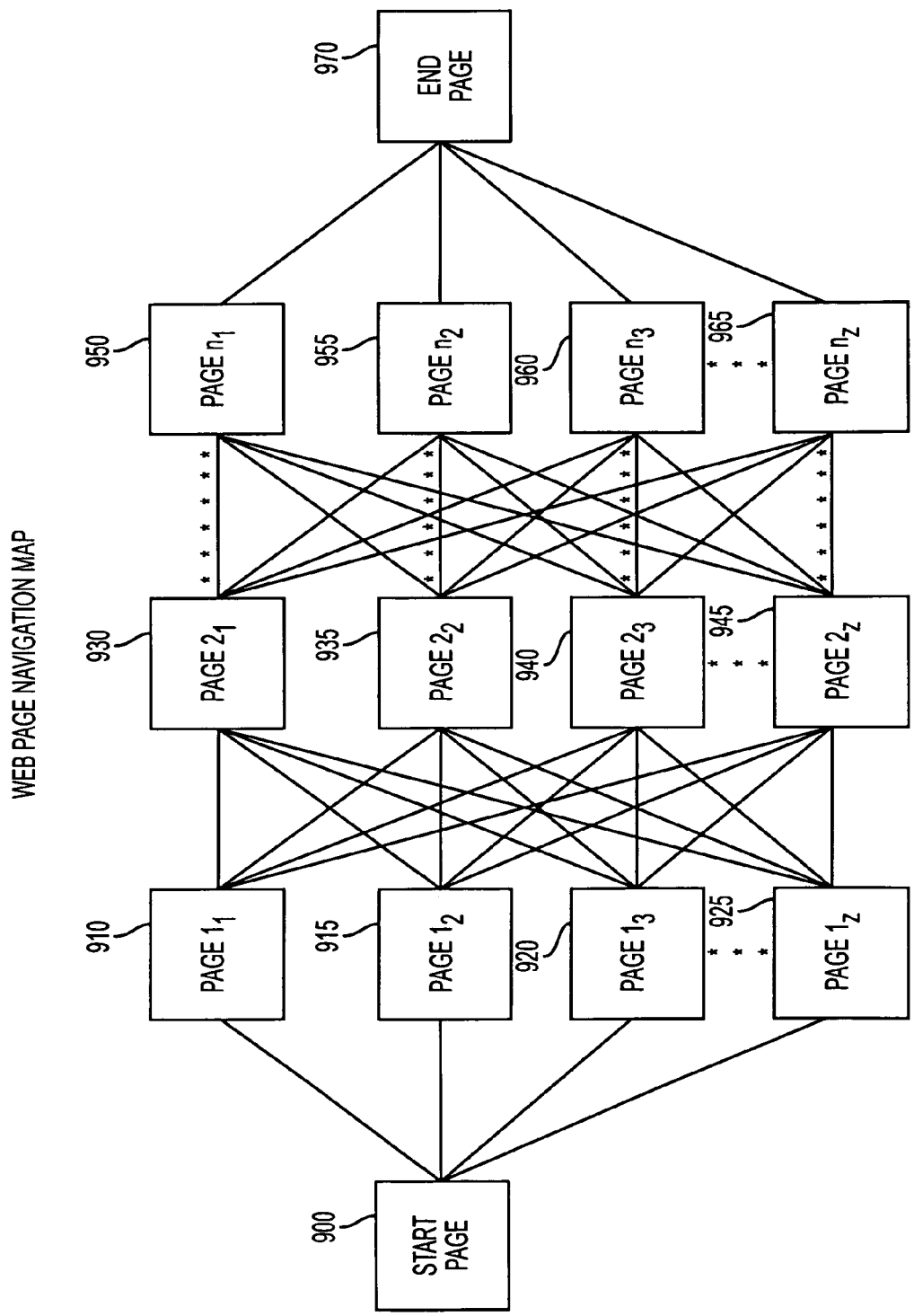
FIG. 7 shows a web page navigation map in an embodiment of the present invention.

Part of the content created by the author and stored in content object database 290 is a navigation map for each scenario, an example of which is shown in FIG. 7. In one embodiment, this navigation map is a visual tool that enables an application author to map out the possible connections among pages in a particular scenario. It reflects the author's initial determination as to which pages can be rendered after the user leaves a particular page. One or more end pages 970 reflect a user's satisfaction of an author's goal for that scenario (e.g., a page displayed after a user purchases a particular product), after which the user might enter a subsequent scenario (not shown) with its own corresponding navigation map.

For any given current page, scenario manager 210 might use the navigation map to determine the set of "next page" links that could be included on the current page. Application rules might further narrow this set to fewer pages, or possibly add a page not reflected in the navigation map. Moreover, when the user presses a "submit" button, the application rules might determine which page from this set should be rendered next. If no such rule was present, a default system rule might randomly select one of the pages from the set reflected by the author's navigation map.

For each scenario, the author specifies a start page 900 and an end page 970. Between start page 900 and end page(s) 970 are various possible paths, reflecting a user's dynamic progression through a scenario, defined by a series of pages (e.g., page 910 to page 930 to page 950). Each step of this dynamic progression may present multiple alternative pages (e.g., pages 910, 915, 920, . . . 925), which may correspond to conceptually different pages that may or may not share the same page template.

The navigation map illustrates the set of possible paths (predefined by the author) among the various pages within an author-defined scenario. Scenario manager 210 interprets the application rules to determine dynamically at runtime which path a user will follow (e.g., upon pressing a "submit" button), as well as which "next page" alternative paths (i.e., links) to include on the current page.

An author might desire to guide different users along different paths from a start page 900 to a desired end page 970. For example, an experienced user who has previously visited the web site and who has a high-bandwidth computing environment may be "pushed" through a path that includes pages displaying minimal help text and rich graphics and video. Such a path might include pages 910, 935, and 965. At the other extreme, a first-time user who has a low-bandwidth computing environment may be "pushed" through a path that includes pages displaying substantial help text, minimal graphics, and no video. Such a path might include pages 920, 940, and 960.

Such distinctions could be determined dynamically, for example, via who conditions reflecting a user's platform (e.g., current bandwidth) and prior behavior (e.g., prior visits to the site). An author could even combine such conditions into a higher-level author-defined variable, such as "experience" (reflecting a certain bandwidth and prior visits to the site or to particular pages).

As noted above, authors need not explicitly reference content objects in an application rule in order to cause the system to select dynamically a content object (via a why condition) to render for particular users (who condition) under particular circumstances. (when condition). For example, a why condition might attempt to select the "next page" most likely to push particular users through the scenario. Aggregate user data might track the percentage of users that reached the end of the scenario from each of the possible alternative pages within N steps. Thus, by explicitly specifying this condition (e.g., select page with "highest aggregate completion percentage") in an application rule, the author can implicitly cause the system to select a particular page (based on dynamic conditions reflecting prior users' actions) that was not explicitly referenced in the rule.

Similarly, an author can implicitly reference content objects at other levels of abstraction (e.g., "tennis ad" content element most frequently clicked on by prior users over the past two weeks). Such rules might be interpreted by other managers (e.g., page manager 220 might determine which content element to include in a particular stack), as discussed in greater detail below.

5. Dynamic Content Composition Engine

As shown in FIG. 2, in an embodiment of this invention, the system includes dynamic content composition engine 200 which communicates with application 270, including application rules database 280 and content object database 290, user profile and behavior database 250, and aggregate information database 260. It dynamically interprets application rules (whether included within application rules database 280 or embedded within particular content objects in content object database 290) reflecting various goals of the application author to adaptively render the appropriate content objects to the appropriate users under the appropriate circumstances.

Figure 8:
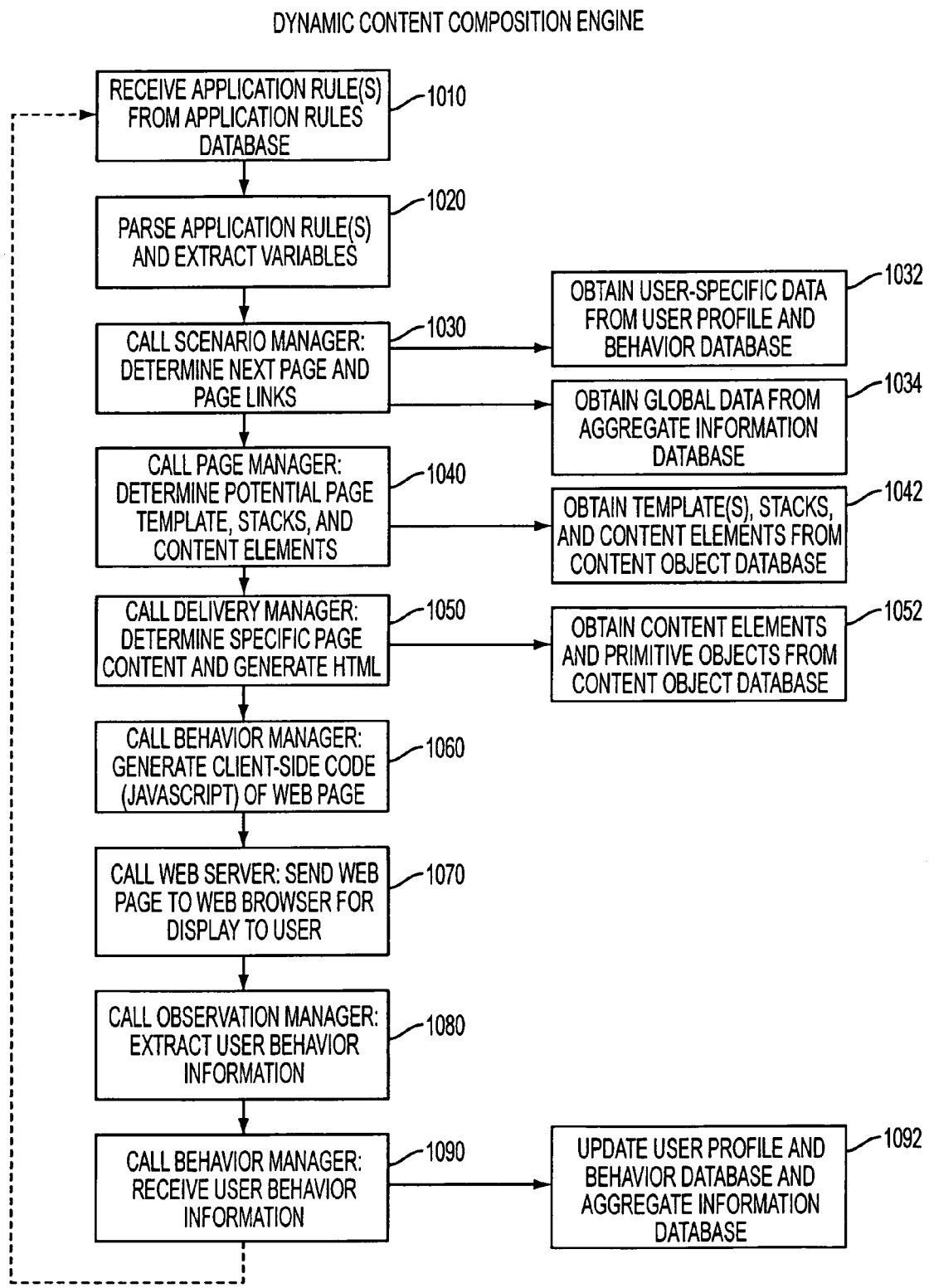
FIG. 8 shows a flowchart of the dynamic content composition engine in an embodiment of the present invention.

In performing these tasks in one embodiment of this invention, composition engine 200 executes the steps described in FIG. 8. Note that these steps could be combined, certain steps removed and others added, and the order modified, in various other embodiments.

Beginning with the first web page to be displayed, and for each subsequent page, the composition engine 200 receives one or more application rules (including the web page navigation map shown in FIG. 7) from application rules database 280 (step 1010). Throughout this process, other application rules may also be received as embedded rules within various content objects of content object database 290. In any case, composition engine 200 parses each application rule and extracts any user-dependent variables (step 1020).

These application rules may be interpreted throughout all subsequent steps of the process by the appropriate managers. As noted above, certain rules may even be interpreted by multiple managers. Rules that are embedded in content objects may only be interpreted in the context of that particular content object. For example, if an application rule directs the system (e.g., page manager 220) to render a particular content element containing an embedded application rule (e.g., displaying help text when the user's mouse is over that content element if the user is "inexperienced"), then the embedded application rule would be interpreted only in the context of that content element In other words, the help text might be included with the content element only if the current user satisfies the "inexperienced" condition (tested at the time the content element is selected by page manager 220). Once downloaded, client-side code (e.g., JavaScript) might display help text upon detecting that the user's mouse is over that content element.

Composition engine 200 calls upon scenario manager 210 (an internal software module) to determine the next page to be displayed to the user as well as links to other pages which will be included on that next page (step 1030). As a part of this processing, and dependent upon the particular application rules being interpreted, scenario manager 210 may access user-specific data from user profile and behavior database 250 (step 1032) and compiled global data regarding other users' behavior and demographics from aggregate information database 260 (step 1034).

After interpreting all relevant application rules and determining the next page to be rendered to the user (including subsequent next-page links to be included within that page), composition engine 200 calls page manager 220 (an internal software module) in order to determine the template of that page, as well as potential stacks and content elements to be included in such page (step 1040). As discussed above, the application rules interpreted by page manager 220 will determine which page template, stacks, and content elements from content object database 290 will be included within that page (step 1042).

After determining the template of the next page, and its internal stacks and content elements, composition engine 200 calls delivery manager 230 (an internal software module) in order to determine the representation of the dynamically selected content elements, including component primitive objects (and perhaps other component content elements), to be rendered for the selected next page (step 1050). As a part of this processing, delivery manager 230 interprets application rules (e.g., rules referencing user platform and bandwidth data, or other application state) to select particular content objects from content object database 290 included within application 270 (step 1052).

Delivery manager 230 also generates the HTML representation of the page to be rendered (as a part of step 1050). As noted above, in one embodiment, the various dynamically selected content objects are stored in content object database 290 in standard XML format. After being selected for rendering with the (also dynamically) selected next page, this content is converted into an HTML web page for delivery to the user.

After delivery manager 230 determines the selected content, and in parallel with its conversion of this content into an HTML representation of the web page, composition engine 200 calls behavior manager 240 (an internal software module) in order to generate the client-side code (e.g., JavaScript) to be included within that HTML web page (step 1060). The actual JavaScript or other client-side code may be dependent upon certain dynamic variables (e.g., the particular content objects selected for the web page), and thus may have to be generated dynamically at this point in the process (rather than generated entirely in advance by the author).

Composition engine 200 then calls web server 300 to deliver the web page 305 to client-side web browser 310 for display to the user (step 1070). Upon display of web page 305, composition engine 200 calls observation manager 320 in order to obtain user behavior data extracted by observation manager 320 (step 1080). Note that observation manager 320 may be implemented entirely as client-side code, and thus need not be "called" by composition engine 200. Instead, it may execute locally (at the client), extract relevant user behavior information, and communicate that information back to composition engine 200 (in particular, to behavior manager 240, e.g., via web server 300).

Composition engine 200 calls behavior manager 240 to receive the user behavior information 325 extracted and sent by observation manager 320 (step 1090). Behavior manager 240 processes such user behavior information 325, e.g., to combine such raw information into higher-level author-created variables, which are resolved in accordance with relevant application rules. Such information is then used to update user profile and behavior database 250 and aggregate information database 260 (step 1092).

In one embodiment, composition engine 200 simply repeats this process for each application rule to be interpreted and executed.

a. Scenario Manager

As shown in FIG. 2, in an embodiment of this invention, the system includes scenario manager 210, which is an internal software module of dynamic content composition engine 200. Scenario manager 210 manages the automated "dialogue" between the system and the user as the user navigates through the pages of application 270, in particular determining, in the context of the user's current scenario, which page to display next (e.g., after the user presses a "submit" button on the current page), and which subsequent next-page links to include on that page.

As noted above, the author pre-specifies (e.g., via a navigation map as illustrated in FIG. 7) a set of alternative next pages from any given page in a particular scenario (though additional alternative pages could be added via application rules). From these alternatives, and in accordance with the various relevant application rules and their component static and dynamic state, scenario manager 210 must select the next page (and next-page links) to be rendered to the user. The template and intra-page contents of that page will also be determined dynamically, but by other managers of composition engine 200.

Scenario manager 210 also determines and updates dynamically the user's "scenario," for example, if the user reaches an "end page" of the current scenario and/or explicitly links to a page in another scenario, which may be used as a parameter of various application rules interpreted by scenario manager 210 or other managers of composition engine 200.

In the process of interpreting relevant application rules, scenario manager 210 makes use of both explicit information (e.g., user profile information or an explicitly-referenced content object or other application state variable) and implicit information (e.g., most popular banner ad, or a correlation between user behavior and user profile information).

Beginning with a start page 900 and one or more end pages 970, as shown in the navigation map illustrated in FIG. 7, scenario manager 210 interprets application rules to map the user's path—or possible paths—through the scenario, in the process dynamically narrowing or widening the path based on such information. In performing this function in one embodiment of the present invention, scenario manager 210 executes the steps shown in FIG. 9. Note that these steps could be combined, certain steps removed and others added, and the order modified, in various other embodiments.

Scenario manager 210 begins its processing of a particular application 270 for a particular user by receiving the applicable application rule(s) and variables from dynamic content composition engine 200 (step 1100). These rules may require scenario manager 210 to obtain data specific to a current user from user profile and behavior database 250 (step 1110). In determining the scenario and subsequent pages and links, scenario manager 210 might be directed by certain application rules to consider user-specific information regarding the user's computing environment (e.g., CPU, operating system, current bandwidth, etc.) as well as observed information regarding pages previously visited by the user, including the user's behavior or prior actions on such pages (in the current or prior sessions). Scenario manager 210 may also be directed to obtain analogous global data from aggregate information database 260 (step 1120), reflecting, for example, the prior actions and profiles of other users.

Scenario manager 210 also determines the user's scenario within application 270, based, for example, on user behavior information from user profile and behavior database 250 and aggregate information database 260 (step 1130). For example, on a web page featuring stereo equipment for sale, the user's click on a specific brand of compact disc player, combined with global data showing that other users who clicked on that specific brand usually made a purchase during the current session, could indicate a switch from the "Explore" to the "Decide" scenario (i.e., subsequent web pages in which the user may decide whether to purchase a particular item of stereo equipment). A different action by the user (e.g., clicking on a link to general information about compact disc players) might indicate the "Explore" scenario.

In addition to determining the current (perhaps new) scenario, scenario manager 210 may interpret other application rules (and recalculate certain primitive and author-defined variables based upon user profile and behavioral data and other application state) (step 1140). Such variables are used to resolve dynamically the conditions specified in those application rules designed to select the implicit next page (e.g., after user presses "submit" button) (step 1150), as well as the explicit component external links positioned on such page (e.g., displayed within a navigation bar with buttons that change dynamically) (step 1160).

To determine the next page and subsequent next-page links in steps 1150 and 1160, scenario manager 210 may take into account the set of potential next pages specified by the author for a particular scenario (e.g., via the web page navigation map shown in FIG. 7). Scenario manager 210 may also execute scenario-specific application rules that determine explicitly the desired order of pages within a scenario.

For example, if the user is in an "Explore" scenario within a stereo equipment application, scenario manager 210 may determine (e.g., in accordance with one or more application rules), based on specific user information and global statistical information, the five most likely products that the user will want to purchase, and include prominent links to the respective pages describing each of those products. In addition, scenario manager 210 may provide a "search for another product" link to provide the user with additional flexibility.

In determining the next page and links to subsequent pages, scenario manager 210 may apply statistical application rules, for example, display the page (e.g., "Page X") from which the largest percentage (e.g., 40 percent) of aggregate users reached the end of the current scenario within five "steps" or links. Such percentages might be recalculated by the system on an ongoing basis (e.g., after pre-scanning the conditions specified in the application rules) whenever a user requests another page.

Other application rules may use ranking techniques, for example, display the page that has the fewest steps to an end page of the current scenario among the possible next pages, or randomly select a page from among those pages with fewer than five steps to such an end page.

As a final step in this embodiment, scenario manager 210 associates the selected external links with the selected next page to be rendered to the user (step 1170). Before the page is rendered, the template and remaining contents of that page are then determined dynamically by other managers, as described below.

b. Page Manager

As shown in FIG. 2, in an embodiment of this invention, the system includes page manager 220, which is an internal software module of dynamic content composition engine 200. Page manager 220 determines dynamically the organization and content of the conceptual pages of application 270 specified by the author (e.g., in XML format), including page templates and component stacks and content elements.

Using the scenario, next page, and links determined by scenario manager 210, page manager 220 interprets application rules to determine which template (i.e., page layout) to use, which stacks to place on the page, and which content elements to place within the stacks. In one embodiment, page manager 220 executes the steps shown in FIG. 10. Note that these steps could be combined, certain steps removed and others added, and the order modified, in various other embodiments.

Page manager 220 begins its processing of a particular page for a particular user by receiving the applicable application rule(s) and variables from dynamic content composition engine 200 (step 1200). Page manager also receives the scenario and page, including external links or "exit points" from that page determined by scenario manager 210 (step 1210).

In accordance with the relevant application rules, page manager 220 may access certain data regarding the current user from user profile and behavior database 250 (step 1220). In determining the template, stacks, and content elements for the particular page, page manager 220 may consider user-specific information regarding the user's computing environment as well as observed information regarding pages already visited by the user, the user's actions on such pages (e.g., with respect to particular content elements), and how long the user spent on each page, or component stack or content element.

For example, the user's computing environment information (e.g., bandwidth, browser type and version) may determine whether the user should be provided with rich content or sparse content. The user's previous actions on pages within the application (from the current or prior sessions) may indicate that the user should be provided with content elements including additional explanations and fewer input fields if, for example, the user has made numerous errors in entering data on past pages.

Page manager 220 selects from among alternative system or author-created templates for the page, as well as potential stacks and content elements (e.g., in XML format) to populate such template, from content object database 290 (step 1230), in accordance with relevant application rules. For example, if the hypothetical template shown in FIG. 4 were selected as a potential template (e.g., for certain users meeting certain conditions specified in an application rule), page manager 220 might then interpret other application rules directing the system to select stacks to occupy stack positions 460, 470, and 480, as well as potential content elements to occupy content element positions 462, 464, 472, and 482.

After page manager 220 determines the appropriate page template, page manager 220 determines which stacks will occupy portions of the template (step 1250) and which and how many content elements will populate such stacks (step 1260). Finally, page manager 220 associates the selected template, stacks, and content elements with the page so that they may be processed by delivery manager 230, and converted from XML objects into an HTML web page.

c. Delivery Manager

As shown in FIG. 2, in an embodiment of this invention, the system includes delivery manager 230, which is an internal software module of dynamic content composition engine 200. Delivery manager 230 determines the specific representation of the content (e.g., content elements) of the pages of application 270 selected dynamically by scenario manager 210, and converts such content from XML to HTML format. Using the scenario, next page, and links determined by scenario manager 210, and the template, stacks, and content elements determined by page manager 220, delivery manager 230 interprets application rules to determine what "form" of content the user will experience when the page is displayed, e.g., video, audio, graphics, or text representations.

During performance of this function, delivery manager 230 may access (in accordance with relevant application rules) user-specific information, such as the user's computing environment (e.g., current bandwidth), as well as aggregate user information (e.g., the form of content most frequently selected by prior users). In performing this function in an embodiment of this invention, delivery manager 230 executes the steps shown in FIG. 11. Note that these steps could be combined, certain steps removed and others added, and the order modified, in various other embodiments.

Delivery manager 230 begins its processing of a particular page for a particular user by receiving the applicable application rule(s) and variables from dynamic content composition engine 200 (step 1300). Page manager also receives the scenario and page, including links or exit points, determined by scenario manager 210 (step 1310), and the page template, stacks, and content elements determined by page manager 220 (step 1320).

Delivery manager 230 may obtain user-specific data regarding the user from user profile and behavior database 250 (step 1330), including information regarding the user's computing environment as well as observed information regarding pages already visited by the user, the user's actions on such pages (e.g., with respect to particular content elements), and how long the user spent on each page, or component stack or content element. For example, the user's computing environment information (e.g., current bandwidth, presence of browser plug-ins, etc.) may be a factor (e.g., explicitly referenced in an application rule) in determining whether the user should be provided with video or audio versions of particular content elements.

Delivery manager 230 may also obtain component primitive objects (or even other content elements) that will populate content elements (selected by page manager 220 from content object database 290) on the selected page (step 1340), in accordance with relevant application rules. Such component primitive objects or content elements are selected dynamically in the same manner as described above, for example, by resolving dynamic conditions relating to user profile or behavioral data, aggregate user data or other application state.

For a given component primitive object or content element, delivery manager 230 also determines the representation of each "container" content element selected by page manager 220 (step 1350). As shown in FIG. 3(*a*), a content object (e.g., content element or primitive object) may be thought of as a "cube," each face of which has a different representation or format of the "same" conceptual object.

For example, a "tennis racquet" ad content element could be portrayed solely as text, or with a simple graphic, animation, or even a video clip or three-dimensional (3D) navigable object. Delivery manager 230 interprets application rules to determine the appropriate representation—e.g., depending upon the user's bandwidth or prior behavior.

In one embodiment of this invention, delivery manager 230 employs a weighting algorithm to make this determination, where different point amounts are assigned to different factors (e.g., aspects of the user's computing environment, such as bandwidth, browser type and version, etc.). The factor-points are summed and delivery manager 230 will select the appropriate alternative representation depending upon the total number of points. Each alternative representation may consist of one or more component content elements and/or primitive objects.

In one embodiment, delivery manager 230 can provide feedback to page manager 220, resulting in a reselection of different content elements than it selected initially. For example, based upon the summed weighted point value calculation referred to above, delivery manager 230 might determine that no available representation of the initially selected content element satisfies the requirements of one or more application rules. Under such conditions, it may query page manager 220 to eliminate that content element and reselect another alternative. This process could be repeated until a suitable alternative is selected, preferably with some mechanism for terminating the process (e.g., a designated default alternative, or a maximum of three attempts to reselect a suitable alternative).

In addition to selecting an appropriate representation, delivery manager 230 may also interpret the application rules to select among alternative primitive objects (or other component content elements) to populate certain selected content elements (step 1360). For example, a text representation of a content element may include three text fields (i.e., three primitive objects), which could be selected from among multiple alternative sets of three text fields, in accordance with one or more application rules. A video representation of the same content element might also include different alternative text or graphic elements along with a video object.

Delivery manager 230 may also interpret application rules that select among different representations of primitive objects, in the same manner as described above for the content elements (step 1370). Finally, delivery manager 230 converts the XML objects (stacks, content element, primitive objects, external links, etc.) associated with the page into an HTML web page (step 1380), in conjunction with behavior manager 240, as described below.

d. Behavior Manager

As shown in FIG. 2, in one embodiment of this invention, the system includes behavior manager 240, which is an internal software module of dynamic content composition engine 200. Behavior manager 240 dynamically generates client-side code (e.g., JavaScript) for inclusion into the web pages 305 generated by delivery manager 230, which are delivered by web server 300 to web browser 310 for display to the user.

In generating the client-side code, behavior manager 240 uses the author-created XML descriptions stored in content object database 290, also in accordance with relevant application rules, which reference (among other user profile/behavioral data and application state) user behavior information 325 extracted by client-side observation manager 320. In performing this function in one embodiment of this invention, behavior manager 240 executes the steps shown in FIG. 12. Note that these steps could be combined, certain steps removed and others added, and the order modified, in various other embodiments.

Behavior manager 240 begins its processing of a particular page for a particular user by receiving the applicable application rule(s) and variables from dynamic content composition engine 200 (step 1400). Behavior manager 240 interprets application rules to select from among XML descriptions of the desired client-side behavior (e.g., selecting pre-delivered help text associated with certain text fields based on elapsed mouse-over time, or user profile/behavioral characteristics) and convert such XML objects into client-side code (e.g., JavaScript) for inclusion within web page 305 (step 1410), delivered by web server 300 to web browser 310 and displayed to the user.

Behavior manager 240 continually (or, in some embodiments, periodically) receives user behavior information 325 extracted by client-side observation manager 320 (step 1420). Observation manager 320 extracts such information from the user's interaction with the current web page 305, and formats and transfers the information to behavior manager 240.

User behavior information 325 may include data regarding the user's behavior and preferences while using the system, such as: responses to queries and text entry into data fields; elapsed time spent viewing particular content objects (e.g., pages, stacks, content elements, and/or primitive objects); content objects clicked on by the user; movement of the mouse over particular content objects; and areas of particular templates where users spent the most time.

Such user behavior information 325 may in turn trigger certain client-side functionality (e.g., displaying help text) or could be returned to the system by observation manager 320, whereupon behavior manager 240 could dynamically update and/or replace web page 305 with additional client-side code. For example, a user's recent response to a question may cause behavior manager 240 to "delete" primitive objects in a subsequent web page showing options that conflict with user's response. Behavior manager 240 also captures and formats the user behavior information 325 such that it can be used to update user profile and behavior database 250 and aggregate information database 260 (step 1430).

In an embodiment of this invention, the system employs a technology that allows the binding of server-side objects to client-side HTML code within the web page 305 delivered to the user. This functionality allows very rapid construction of complex web applications without the extraordinary maintenance requirements that would characterize current systems.

Currently, functionality within the web browser 310 can be associated with server-side objects only through delivery of higher order code (e.g., Java applets) using dedicated communication channels (e.g., sockets). This implementation burdens the client-side environment with heavy code downloads and specific functionality that is not present in all browser versions. It also requires that the content developer be versed in Java code or similar languages. Access to objects on the web server 300 from the web browser 310 is a deviation from the stateless browser model. An area in the browser 310 is set aside for a client-side application that may call server-side functions.

The "Open Session Object" technology developed for this system represents two significant and substantial technological breakthroughs. First, the open session objects ("OSOs") can be accessed from anywhere in the virtual environment (e.g., browser, server-side application code, or server-side HTML constructions) through HTTP tunneling (i.e., simulating a new protocol within HTTP which acts as the transport protocol) from the browser 310. The OSOs can also be accessed from within the server-side process or across server-side processes using standard object-to-object communication protocols (e.g., RMI, Corba, DCOM, etc.).

OSOs extend the stateless browser model. Decision-making can be moved to the browser if desired. For example, the browser 310 can be loaded with an appropriate library of calls to OSOs that are called dynamically by the HTML, based on user behaviors. Upon some user action, the HTML (e.g., JavaScript) decides which OSOs to invoke and sends appropriate calls to the server 300. Decision-making is now available on the browser 310 without the need for heavy client-side code.

The development of a lightweight remote method invocation (used generally here, not to be confused with the specific RMI protocol developed by Sun Microsystems, Inc.) of objects from the client browser via HTTP is a substantial advance in the functionality available to HTML/JavaScript developers. These direct object calls can be embedded into the HTML and provide complex behaviors to easily assembled applications.

The second major advance is that the OSOs are accessible to content developers with little or no coding skills beyond HTML and JavaScript. Simple server-side "includes" (i.e., embedded tags within the HTML) are used to invoke methods. Current technologies, such as Application Server Pages ("ASPs") or Java Server Pages ("JSPs"), embed special tags but such tags are procedure calls rather than direct method calls. The special OSO tags are easily learned by HTML application designers.

The OSO design allows the primary actions of the object to be abstracted in a way that reduces development and maintenance requirements on programmers. The OSO can receive requests and associated session information directly from the client browser 310. The OSO stores the session information, updates session states based on rule structures within the application 270, or otherwise alters the external environment to represent client behaviors. The OSO executes application-specific operations that may include rendering HTML or instantiating another OSO. For example, based on the client request, application rules, and external data (e.g., session information, profile information, more general application statistics), the OSO renders dynamically HTML snippets for the next client page. These snippets are organized by the system into the web page 305 delivered to the client as described earlier.

OSO calls can be nested to produce more complex behaviors. An OSO may be called by another OSO just as it is called by the client code. The OSOs have global availability within the system. The OSOs may also have cross-session availability. That is, several simultaneous sessions may be interacting with a single OSO, thus enabling the system to scale efficiently.

Two instantiations of OSOs—"Intelligent Render Points" and "Field Object System OSOs"—are described below.

Intelligent Render Points ("IRPs") are OSOs that sense external environmental conditions and then adaptively render themselves as HTML. IRPs are used for general areas within a web page 305 that have a specific objective; content is adapted within those areas using purpose-based rule sets and tagged content elements.

An example of an IRP implementation is a status "tile" within a mortgage web page. The content elements that communicate the status of a loan application are assembled by an IRP based on rules that execute using client-session State, user profile data, lender data, and rule parameters.

"Field Object System" ("FOS") OSOs represent small pieces of responsive HTML that react to user inputs, e.g., fields within an on-line application form. Each field is a field object within a FOS. Such field objects may have several render "levels" that respond to specific user inputs. For example, Level 0 is for printable fields (read only)

Level 1 is the basic field (read and write)

Level 2 is the basic field plus an error message when the field is omitted

Level 3 is the basic field plus an error message for validation errors

Level 4 is the basic field plus a message for a repeat omission (second submission with omission)

Other render levels are available based on a designed rule set. The content author merely identifies the conditional state and the content response in the design of the field object. The FOS OSO controls the behavior dynamically.

Field objects may be grouped into fields with group level behaviors that manage how the render levels are activated. Higher order groupings with layered rule sets are available within the FOS.

1. Client-Side Functionality

As shown in FIG. 2, in one embodiment of this invention, dynamic content composition engine 200 communicates with client-side web browser 310 and observation manager 320. Observation manager 320 is a software module in communication with dynamic content composition engine 200. Observation manager 320 records and extracts user behavior information 325 from a user's session within application 270 and can generate certain content 330 (e.g., by triggering client-side code generated by behavior manager 240) for display on web browser 310, in essence self-modifying web page 305. In performing this function in one embodiment of this invention, observation manager 320 executes the steps shown in FIG. 13. Note that these steps could be combined, certain steps removed and others added, and the order modified, in various other embodiments.

Observation manager 320 begins its processing regarding a particular page for a particular user by receiving the applicable application rule(s) from dynamic content composition engine 200 (step 1500). After web browser 310 displays a particular web page 305, observation manager 320 invokes client-side code (e.g., JavaScript), perhaps in accordance with application rules embedded within certain content objects of web page 305, to observe and extract user behavior information (step 1510).

Such client-side functionality may include "timers" to track the amount of time the user spent on particular content objects, including, for example, primitive objects (e.g., data entry fields), content elements (e.g., a video clip), and stacks (e.g., a navigation toolbar). Such code may also track the user's behavior, for example, progress in completing discrete fields within a form on the current web page. Observation manager 320 transfers such raw user behavior information 325 to behavior manager 240 (step 1520), where it can be used to update certain application state, such as author-defined variables (e.g., number of seconds required to complete a section of a form).

Observation manager 320 may also dynamically generate certain content 330 (e.g., help information) in response to extracted user behavior for updating web page 305 (step 1530).

2. Miscellaneous Features

In addition to the features described herein, the following are some further miscellaneous features designed to enhance the adaptive-rendering functionality of the system described above.

a. Field Pre-Population

Certain text fields (e.g., primitive objects) can be personalized with default values extracted from user profile and behavior database 250, such as the user's name, login ID, social security number, credit card number, and other demographic information. In addition to such static information, certain dynamic behavioral information can be used to pre-populate text fields and to pre-select a category or other item from a pop-up list. (e.g., a user's prior selection of interest rate in "variable-rate" mortgage products).

b. Field Push Forward

The system, upon detecting certain errors in a user's text entry (e.g., a skipped or improperly filled-out field) could include such content objects as part of the next web page dynamically delivered to the user. For example, if a user incorrectly filled out a portion of a multi-page form (e.g., field 7 of the first 10 fields displayed on the initial web page), the next page might include field 7 (with some additional help text to assist the user) along with fields 11-19, thereby maintaining a consistent 10-field page format.

This feature can be managed by a hierarchical set of application rules to maintain the user's momentum in completing, for example, a mortgage application form. These rules would be designed to increase the likelihood that the user will complete the form, even across multiple web pages.

Certain fields can be weighted more heavily than others to established differing priorities among fields. For example, an application rule might establish a maximum number of "points" for a particular web page, depending upon the user's experience mode (e.g., "power" users are allotted a greater number of points). Text fields could be assigned certain associated point values (e.g., pre-assigned by the author) reflecting their size, importance, etc.

c. Content Filtering

The system could deliver only those fields relevant to the user, based upon the user's profile and/or behavioral data. For example, if the user previously indicated the absence of a "co-borrower" in connection with a mortgage application, various subsequent text fields relating to or dependent upon co-borrowers could dynamically be omitted from inclusion in future web pages.

d. Virtual Bandwidth

The system can appear to offer increased bandwidth to a user's connection by intelligently pre-fetching and delivering to the user's web browser the most likely next pages (and/or component content objects) while the current web page is being viewed. Such determinations can be based, for example, on individual and/or aggregate user profile and behavioral data, including user platform information (e.g., current bandwidth, operating system, browser/plug-ins, etc.).

What is claimed is:

1. A method for adaptively rendering, to users of a computer network application, a plurality of content pages generated dynamically from a plurality of content objects compiled by an author of the application, the method comprising the following steps:
    (a) compiling a user database from individual and aggregate user profile data and observed user behavioral data;
    (b) compiling a content database from a hierarchy of content objects, including primitive objects, content elements containing a plurality of primitive objects, content pages containing a plurality of content elements and primitive objects, and user scenarios containing a plurality of content pages;
    (c) facilitating the author's creation of a rule effecting author-defined scenarios, based at least in part on dynamic data from the user database, that dynamically selects subsets of users to receive subsets of content objects, the rule having a parameter that is resolved only dynamically at runtime, wherein a navigation map initially defines the set of possible paths among the various web pages within the author-defined scenarios; and
    (d) dynamically interpreting the rule to render content pages, the content pages including a first subset of content objects delivered over the network to a first subset of users, and a second subset of content objects delivered over the network to a second subset of users, wherein a plurality of templates are selected dynamically based on the interpretation of the rule to determine the size and location of the dynamically selected content objects.

2. The method of claim 1 wherein the parameter is resolved based at least in part upon aggregate observed user behavior.

3. The method of claim 2 further comprising dynamically selecting a user scenario based on the aggregate observed user behavior, wherein the user scenario comprises a plurality of linked content pages and the aggregate observed user behavior comprises a percentage of users that reached the end of the user scenario.

4. The method of claim 3 wherein the user scenario comprises two or more alternative paths to reach the end of the user scenario and the aggregate observed user behavior comprises the percentage of users that reached the end of the scenario from each of the two or more alternative paths.

5. The method of claim 3 wherein the aggregate observed user behavior comprises the percentage of users that reached the end of the user scenario within a certain number of steps.

6. The method of claim 1 wherein subsequent content pages are pre-fetched and delivered to a user's web browser while the user is viewing a current content page, and such pre-fetching is based on the user's profile and observed behavioral data.

7. A system adaptively rendering, to users of a computer network application, a plurality of content pages generated dynamically from a plurality of content objects compiled by an author of the application, the system comprising:
    a processor comprising:
    (a) a user database compiling individual and aggregate user profile data and observed user behavioral data;
    (b) a content database compiling a hierarchy of content objects, including primitive objects, content elements containing a plurality of primitive objects, content pages containing a plurality of content elements and primitive objects, and user scenarios containing a plurality of content pages;
    (c) an application builder facilitating the author's creation of a rule effecting author-defined scenarios based at least in part on dynamic data from the user database, that dynamically selects subsets of users to receive subsets of content objects, the rule having a parameter that is resolved only dynamically at runtime, wherein a navigation map initially defines the set of possible paths among the various pages within the author-defined scenarios; and (d) a dynamic content composition engine for dynamically interpreting the rule to render content pages, the content pages including a first subset of content objects delivered over the network to a first subset of users, and a second subset of content objects delivered over the network to a second subset of users, wherein a plurality of templates are selected dynamically based on the interpretation of the rule to determine the size and location of the dynamically selected content objects.

8. The system of claim 7 wherein the parameter is resolved based at least in part upon aggregate observed user behavior.

9. The system of claim 8 further comprising dynamically selecting a user scenario based on the aggregate observed user behavior, wherein the user scenario comprises a plurality of linked content pages and the aggregate observed user behavior comprises a percentage of users that reached the end of the user scenario.

10. The system of claim 9 wherein the user scenario comprises two or more alternative paths to reach the end of the user scenario and the aggregate observed user behavior comprises the percentage of users that reached the end of the scenario from each of the two or more alternative paths.

11. The system of claim 9 wherein the aggregate observed user behavior comprises the percentage of users that reached the end of the user scenario within a certain number of steps.

12. The system of claim 7 wherein subsequent content pages are pre-fetched and delivered to a user's web browser while the user is viewing a current content page, and such pre-fetching is based on the user's profile and observed behavioral data.

* * * * *

UNITED STATES PATENT AND TRADEMARK OFFICE
CERTIFICATE OF CORRECTION

PATENT NO. : 7,558,748 B2  Page 1 of 1
APPLICATION NO. : 11/011472
DATED : July 7, 2009
INVENTOR(S) : Dain Ehring et al.

It is certified that error appears in the above-identified patent and that said Letters Patent is hereby corrected as shown below:

Title Page, item (75), please change "Dan" to read --Dain--.

Signed and Sealed this

Eighteenth Day of August, 2009

David J. Kappos
*Director of the United States Patent and Trademark Office*